(12) United States Patent
Haran

(10) Patent No.: US 9,203,665 B1
(45) Date of Patent: *Dec. 1, 2015

(54) RESOURCE OPTIMIZATION BY IMPLEMENTING MULTIPLE INSTANCES OF A SOFT MODEM WITH A SINGLE MICROCONTROLLER

(71) Applicant: Smart Embedded Systems, Inc., Fremont, CA (US)

(72) Inventor: Pranatharthi Subbaratnam Haran, Fremont, CA (US)

(73) Assignee: Smart Embedded Systems, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,376

(22) Filed: May 18, 2015

Related U.S. Application Data

(63) Continuation-in-part of application No. 14/466,970, filed on Aug. 23, 2014, now Pat. No. 9,106,488.

(51) Int. Cl.
*H04B 1/38* (2015.01)
*H04L 27/12* (2006.01)
*H04L 25/40* (2006.01)

(52) U.S. Cl.
CPC .............. *H04L 27/122* (2013.01); *H04L 25/40* (2013.01)

(58) Field of Classification Search
CPC   H04M 11/06; H04M 11/062; H04L 25/4927; H04L 5/1438; H04L 27/2608; H04L 27/2601; H04L 1/0025; H04B 1/40; H04B 3/23; H04B 1/403

USPC .................................. 375/222, 219, 316, 295
See application file for complete search history.

(56) References Cited

U.S. PATENT DOCUMENTS

| | | | | |
|---|---|---|---|---|
| 2009/0168857 | A1* | 7/2009 | Golborne | H04L 27/1563 375/223 |
| 2011/0172790 | A1* | 7/2011 | Alley | G05B 19/0423 700/17 |
| 2011/0286542 | A1* | 11/2011 | Shelburne | H04L 27/122 375/272 |
| 2013/0107919 | A1* | 5/2013 | Burns | H04L 27/10 375/219 |

* cited by examiner

*Primary Examiner* — Zewdu Kassa
(74) *Attorney, Agent, or Firm* — Ash Tankha; Lipton, Weinberger & Husick

(57) ABSTRACT

A method and a highway addressable remote transducer (HART) soft modem device for modulating and demodulating one or more analog signals with HART messages are provided. A phase coherent frequency shift keying (FSK) modulator modulates and transmits the analog signals, and a phase coherent FSK demodulator receives and demodulates the analog signals. The FSK modulator outputs 1 or 0 for transmission. With oversampling and low pass filtering, digital modulation performed by the FSK modulator results in low jitter and a good signal to noise ratio. The FSK demodulator applies a fast energy detect algorithm and dynamically reduces or increases a clock speed of a central processing unit (CPU) of the HART soft modem device for reducing power consumption of the CPU. Furthermore, the HART soft modem device uses direct memory access and runs multiple instances of a HART soft modem integrated within a microcontroller to reduce an overall power consumption.

10 Claims, 14 Drawing Sheets

RESOURCE OPTIMIZATION BY IMPLEMENTING MULTIPLE INSTANCES OF A SOFT MODEM WITH A SINGLE MICROCONTROLLER

CROSS-REFERENCE TO RELATED APPLICATIONS

This application is a continuation-in-part application of non-provisional patent application Ser. No. 14/466,970, titled "Energy Efficient Highway Addressable Remote Transducer Soft Modem" filed in the United States Patent and Trademark Office on Aug. 23, 2014. The specification of the above referenced patent application is incorporated herein by reference in its entirety.

BACKGROUND

Smart field data devices in use today are generally Highway Addressable Remote Transducer (HART) enabled. HART is a global standard for sending and receiving digital information across analog wires between smart devices and control or monitoring systems. The HART communications protocol is widely recognized as the industry standard for digitally enhanced 4 milliampere (mA)-20 mA smart instrument communication. Use of the HART based technology is growing rapidly and today most major global instrumentation suppliers offer products that implement the HART communications protocol. The HART communications protocol enables two-way digital communication with smart instruments without disturbing 4 mA-20 mA analog signals. The HART communications protocol utilizes, for example, the Bell 202 frequency shift keying (FSK) standard of the Bell 202 modulator-demodulator (modem) of Bell System to superimpose digital communication signals at a low level over the 4 mA-20 mA analog signals. This process enables two-way field communication and makes it possible for additional information beyond the typical process variables to be communicated to and from a smart field instrument.

Current deployment of Highway Addressable Remote Transducer (HART) field data devices utilizes a hardware based Bell 202 modem and a separate microcontroller for a HART communications protocol implementation which adds to the total power. One or more HART field data device implementations, for example, a mixed signal microcontroller such as the MSP430 microcontroller of Texas Instruments, that utilize low power are known in the art. The MSP430 microcontroller utilizes many power saving techniques comprising multiple low power modes (LPMs), for example, LPM1 to LPM3. The current state of the art HART field data device implementations utilize these power saving methods. Although the MSP430 microcontroller can perform direct memory access (DMA) when a central processing unit (CPU) of the MSP430 microcontroller is not powered on or not activated, the HART field data devices that currently exist do not implement this technique. Moreover, the implementations known in the art utilize a poor approximation of the Bell 202 modem and are likely to result in poor performance characteristics in terms of bit error rate and low probability of receiving HART communications protocol messages correctly. Furthermore, combining precise digital signal processing (DSP) algorithms with DMA power saving methods are not implemented in the HART field data devices known in the art.

Highway Addressable Remote Transducer (HART) field data devices are commonly used in industrial automation and control systems. Many of these HART field data devices comprise a microcontroller, a HART modulator-demodulator (modem) compliant to the Bell 202 standard, and an interface arrangement compliant to a conventional 4 mA-20 mA current loop circuit. However, the total component count of the HART modem adds to the overall cost, lowers reliability of the HART modem, and results in higher power consumption. Hence, there is a need for a solution, for example, a soft modem device that eliminates additional components such as modem chips, resistors, capacitors, crystal oscillators, etc., and reduces cost and power. Since the HART communications protocol typically requires less than 1 megahertz (MHz) of central processing unit (CPU) cycles, the HART field data devices allow room for soft modem implementation. A soft modem is a modem with minimal hardware that utilizes a host's resources in place of additional hardware in a conventional modem. Since HART field data devices that utilize Bell 202 modem standards are power sensitive, there is a need for a soft modem implementation of the HART field data device that uses advanced techniques to minimize operating power.

In a typical Highway Addressable Remote Transducer (HART) field data device, modulation is performed via pulse width modulation (PWM). PWM is a modulation technique that controls the width of a pulse based on modulator signal information. Typically, PWM allows control of the power supplied to electrical devices. A conventional PWM modulator utilizes two different frequencies for PWM generation. This type of modulation works well at low baud rates, for example, at 300 bauds in a V.21 or Bell 103 modem, but results in substantial jitter and a lack of phase coherency at higher speeds. Hence, there is a need for a digital modulator with an exact numerical implementation, that outputs 1 or 0 instead of an 8 bit value, that operates at high baud rates, for example, 19200 or 9600 samples per second, and that results in low jitter and a good signal to noise ratio. Further, there is a need for lowering power consumption of the HART field data device by incorporating energy detect schemes to reduce the central processing unit (CPU) speed when no HART analog signal is present, using direct memory access which can work without CPU intervention, thereby lowering CPU power consumption, and changing the CPU clock dynamically as the processing demand of the HART field data device increases. Common energy detection methods for detecting a valid signal to enable power savings in a soft modem utilize an averaging and threshold detection method. These energy detection methods, typically, have a longer time constant and are slow to respond. Hence, there is a need for a quick energy detection method with a slower detection of energy decay.

Typically, multiple Highway Addressable Remote Transducer (HART) modems are required on an input/output (I/O) concentrator side of a control system, where an I/O controller communicates with multiple HART sensor devices, for example, HART sensor nodes. The I/O controller collects and consolidates data from each of the HART sensor devices for further processing, for example, digitization, modulation, etc., upstream in a communication channel. Conventionally, multiple chips, that is, multiple electronic circuits, each performing functions of a single modem, are used in the HART devices. However, this results in an increase in cost and power consumption. Therefore, there is a need for a HART device that consolidates multiple modems into one integrated circuit for optimizing cost and power consumption and increasing reliability of operation of the HART device by optimizing, that is, reducing the number of components used in the HART device.

Hence, there is a long felt but unresolved need for a soft modem implementation of a Highway Addressable Remote Transducer (HART) field data device that requires a low operating power. Moreover, there is a need for a method that performs quick energy detection of digitized analog samples and throttling of the central processing unit (CPU) clock of the HART soft modem device based on the energy detection of the digitized analog samples, for reducing power consumption of the HART soft modem device. Furthermore, there is a need for a HART device implementation that replaces multiple modems with a single integrated circuit for efficient modulation and demodulation of HART messages.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the Highway Addressable Remote Transducer (HART) soft modem device disclosed herein address the above stated needs for a soft modem implementation of a HART field data device that requires a low operating power, and performs quick energy detection of the digitized analog samples and throttling of a central processing unit (CPU) clock of the HART soft modem device based on the energy detection of the digitized analog samples, for reducing power consumption of the HART soft modem device.

The method and the Highway Addressable Remote Transducer (HART) soft modem device disclosed herein modulates and transmits an output analog signal comprising a HART message. The HART soft modem device comprises a parallel to serial converter which implements a process that converts the HART message into a serial data bit stream comprising binary information. The HART soft modem device further comprises a phase coherent frequency shift keying (FSK) modulator that checks a value of the binary information of the serial data bit stream. The phase coherent FSK modulator is hereinafter referred to as an "FSK modulator". The FSK modulator sets a phase change of a carrier signal to a first frequency, for example, 1200 hertz (Hz), when the value of the binary information is 1. The FSK modulator sets the phase change of the carrier signal to a second frequency, for example, 2200 Hz, when the value of the binary information is 0. The FSK modulator accumulates incremental phase change data by continuously adding the phase changes of the carrier signal. The FSK modulator compares the accumulated phase change data with multiple sine values from a predetermined sine value phase table. The FSK modulator selects a sine value corresponding to the accumulated phase change data from the predetermined sine value phase table. The HART soft modem device further comprises a media access unit that converts the selected sine value into an analog signal, in communication with the FSK modulator via a serial parallel interface, for transmission of the HART message.

Also, disclosed herein is a method for receiving and demodulating an analog signal comprising a Highway Addressable Remote Transducer (HART) message. The HART soft modem device disclosed herein further comprises a phase coherent frequency shift keying (FSK) demodulator that receives the analog signal comprising the HART message. The phase coherent FSK demodulator is hereinafter referred to as an "FSK demodulator". The FSK demodulator samples and converts the analog signal into digitized analog samples at a predetermined digital sampling rate. The FSK demodulator processes the digitized analog samples for removing low frequency interfering signals from the digitized analog samples. The FSK demodulator compares signal amplitude of the processed digitized analog samples with predetermined threshold values and applies a fast energy detect algorithm using an energy detector for determining whether further signal processing of the processed digitized analog samples is required. The FSK demodulator reduces the clock speed of the central processing unit (CPU) of the HART soft modem device to a predetermined low frequency value, for example, 1 MHz, when sufficient energy is not detected in the processed digitized analog samples during the comparison.

The frequency shift keying (FSK) demodulator increases the clock speed of the central processing unit (CPU) of the Highway Addressable Remote Transducer (HART) soft modem device to a predetermined high frequency value, for example, 4 MHz, when sufficient energy is detected in the processed digitized analog samples during the comparison. The FSK demodulator introduces a predetermined phase delay in the processed digitized analog samples for producing phase shifted digitized analog samples. The FSK demodulator demodulates the processed digitized analog samples to obtain a demodulated analog signal via phase discrimination by multiplying the processed digitized analog samples from the energy detector with the phase shifted digitized analog samples. The FSK demodulator removes second order frequencies in the demodulated digitized analog samples. The FSK demodulator checks the demodulated digitized analog samples for a binary value. A positive demodulated digitized analog sample represents a 1 and a negative demodulated digitized analog sample represents a 0. The FSK demodulator performs a bit shift operation and assembles an 11 bit character for character generation and bit synchronization of the demodulated analog signal.

Also, disclosed herein is a method for performing energy detection and determining speed of the central processing unit (CPU) clock of the Highway Addressable Remote Transducer (HART) soft modem device. The frequency shift keying (FSK) demodulator of the HART soft modem device comprises a high pass filter and an energy detector. The energy detector receives digitized analog samples from the high pass filter. The energy detector compares the signal amplitude of the received digitized analog samples with predetermined threshold values. The energy detector detects presence of a valid HART analog signal when the comparison results in a value greater than the predetermined threshold values, that is, a predetermined upper threshold value and a predetermined lower threshold value. When a valid HART analog signal is detected, the energy detector increases the speed of the CPU clock of the HART soft modem device to a predetermined high frequency value. The energy detector sets an energy detect count value to a predetermined value and decrements the energy detect count value when the signal amplitude of the received digitized analog samples is less than the predetermined threshold values. The energy detector detects absence of the valid HART analog signal when the energy detect count value is less than zero and reduces the speed of the CPU clock of the HART soft modem device to a predetermined low frequency value for reducing power consumption of the CPU.

Also, disclosed herein is a Highway Addressable Remote Transducer (HART) device implementation that replaces multiple modems with a single integrated circuit for efficient modulation and demodulation of HART messages. Also, disclosed herein is a method for modulating and transmitting multiple analog signals comprising HART messages. In the method disclosed herein, a HART soft modem integrated within a single microcontroller is provided. In this method, the single microcontroller is configured to run multiple instances of the HART soft modem. The HART soft modem is in operable communication with multiple analog to digital converters, a serial peripheral interface, and a parallel to serial converter in the single microcontroller and with a media access unit. The analog to digital converters communicate with multiple sensor devices via multiple analog interfaces. The analog to digital converters convert each of the analog signals comprising the HART messages into digitized analog samples by sampling and digitizing the analog signals. The parallel to serial converter converts each of the HART messages from the digitized analog samples into serial data bit streams comprising binary information. The HART soft modem comprises a phase coherent frequency shift keying (FSK) modulator and a phase coherent FSK demodulator. The FSK modulator of the HART soft modem processes each of the serial data bit streams one at a time in the single microcontroller. The processing of each of the serial data bit streams one at a time in the single microcontroller comprises: checking a value of the binary information of each of the serial data bit streams, setting a phase change value of a carrier signal, accumulating incremental phase change data, comparing the accumulated phase change data with multiple sine values from a predetermined sine value phase table, and selecting a sine value corresponding to the accumulated phase change data from the predetermined sine value phase table. The media access unit, in communication with the phase coherent FSK modulator via the serial peripheral interface, converts the selected sine value into an analog signal for transmission of each of the HART messages.

Also, disclosed herein is a method for receiving and demodulating multiple analog signals comprising highway addressable remote transducer (HART) messages using the HART soft modem integrated within the single microcontroller. The FSK demodulator of the HART soft modem receives each of the analog signals comprising the HART messages. The FSK demodulator samples and converts each of the received analog signals into digitized analog samples at a predetermined digital sampling rate. The FSK demodulator processes the digitized analog samples for removing low frequency interfering signals from the digitized analog samples, compares signal amplitude of the processed digitized analog samples with predetermined threshold values and applies the fast energy detect algorithm using the energy detector, reduces the clock speed of the central processing unit (CPU) of the single microcontroller to a predetermined low frequency value when sufficient energy is not detected in the processed digitized analog samples, and increases the clock speed of the CPU to a predetermined high frequency value when sufficient energy is detected in the processed digitized analog samples. The FSK demodulator further introduces a predetermined phase delay in the processed digitized analog samples, demodulates the processed digitized analog samples to obtain a demodulated analog signal via phase discrimination by multiplying the processed digitized analog samples from the energy detector with the phase shifted digitized analog samples, removes second order frequencies in the demodulated digitized analog samples, checks the demodulated digitized analog samples for a binary value, and performs a bit shift operation and assembles an 11 bit character for character generation and bit synchronization of the demodulated analog signal.

In one or more embodiments, related systems include but are not limited to circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
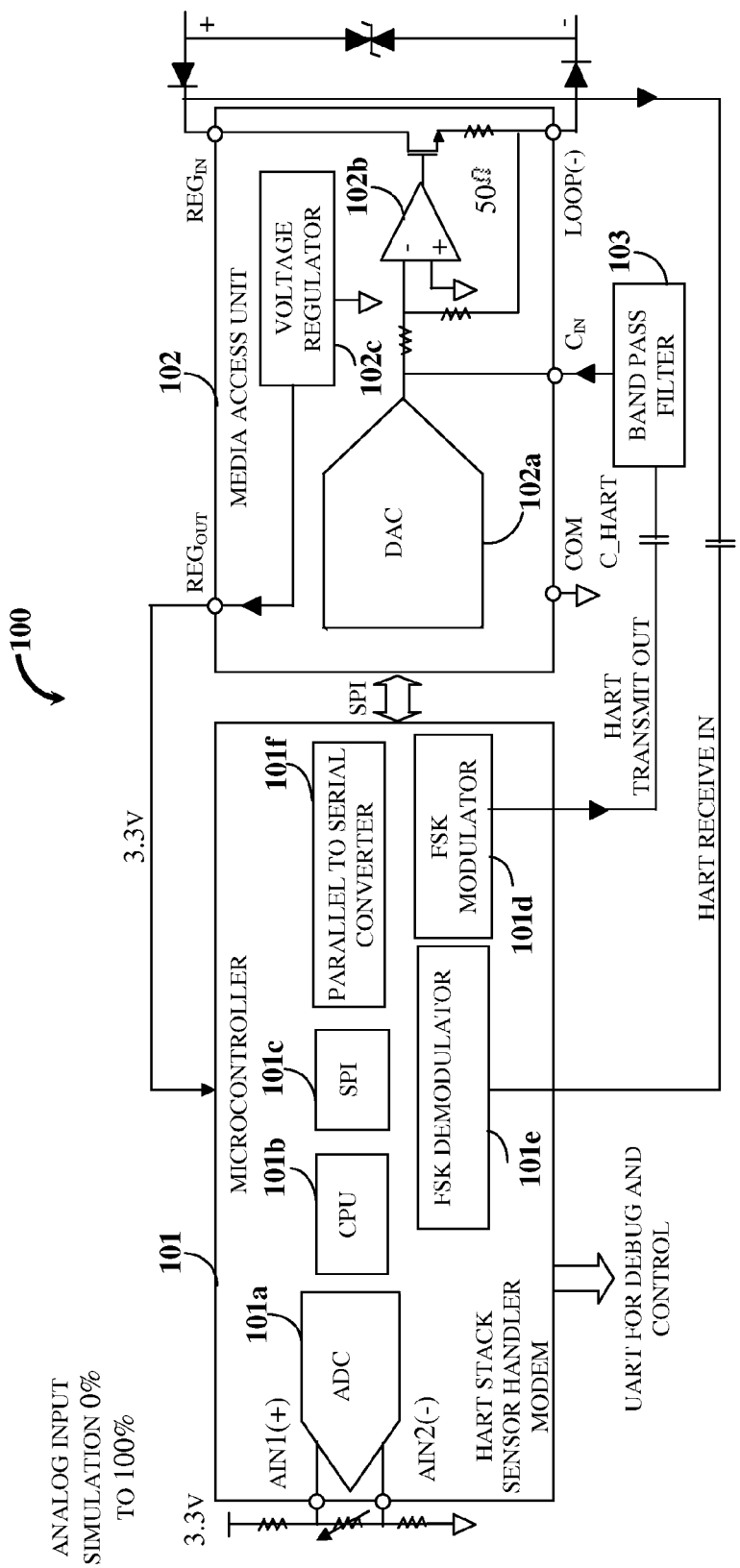
FIG. 1 exemplarily illustrates a block diagram of a Highway Addressable Remote Transducer soft modem device.

FIG. 1 exemplarily illustrates a block diagram of a Highway Addressable Remote Transducer (HART) soft modem device 100. As used herein, "HART soft modem device"

refers to a software modem that incorporates the HART communications protocol. The HART communications protocol is one of the leading communication protocols used worldwide in industrial applications, with the majority of smart field data devices and intelligent process measurement and control systems utilizing this communication technology. The HART soft modem device 100 disclosed herein combines modulator-demodulator (modem) and microcontroller technologies in a single device. In the HART soft modem device 100 disclosed herein, soft modem technology is utilized in the processor or microcontroller 101 that is used for performing HART communications protocol control. The HART soft modem device 100 disclosed herein is a low power HART soft modem device.

The Highway Addressable Remote Transducer (HART) soft modem device 100 disclosed herein comprises a microcontroller 101, a media access unit 102, and a band pass filter 103. The microcontroller 101 performs input and/or output operations and control functions of the HART soft modem device 100. The microcontroller 101 comprises an analog to digital converter (ADC) 101a, a central processing unit (CPU) 101b, a serial peripheral interface (SPI) 101c, a parallel to serial converter 101f, a phase coherent frequency shift keying (FSK) modulator 101d, and a phase coherent FSK demodulator 101e. The phase coherent FSK modulator 101d is hereinafter referred to as an "FSK modulator". The phase coherent FSK demodulator 101e is hereinafter referred to as an "FSK demodulator". The analog to digital converter 101a converts analog signals comprising a HART message into a digital format or digitized analog samples by sampling and digitizing the analog signals. The CPU 101b is communicatively coupled to the analog to digital converter 101a. The CPU 101b converts baseboard communication data packets into HART messages or SPI packets. The SPI 101c provides a communication interface between the microcontroller 101 and the media access unit 102.

The parallel to serial converter 101f converts the highway addressable remote transducer (HART) message into a serial data bit stream comprising binary information. The frequency shift keying (FSK) modulator 101d is communicatively coupled to the central processing unit (CPU) 101b. The FSK modulator 101d modulates the serial data bit stream resulting from serialization of the HART messages and transmits the modulated HART analog signal. In an embodiment, the FSK modulator 101d is a fully digital modulator with an exact numerical implementation and outputs a binary value, for example, 1 or 0 similar to a 1 bit digital to analog converter instead of outputting an 8 bit value. With over sampling at about 19200 samples per second or about 9600 samples per second and with further low pass filtering, the digital modulation results in low jitter and a good signal to noise ratio. In an embodiment, the output can also be generated through a pulse width modulation (PWM) based digital to analog converter (not shown) which provides more precision. The FSK demodulator 101e facilitates receipt of an FSK modulated HART analog signal for demodulation. The FSK demodulator 101e is communicatively coupled to the CPU 101b.

The media access unit 102 is communicatively coupled to the microcontroller 101. The media access unit 102 operably connects the microcontroller 101 to a 4 mA-20 mA current loop circuit as exemplarily illustrated in FIG. 1. As used herein, "media access unit" refers to an electronic device that connects multiple network stations in a predefined topology, for example, a star topology, and is internally wired to connect the network stations into a logical ring. The media access unit 102 comprises a digital to analog converter (DAC) 102a, an amplifier 102b, and a voltage regulator 102c. The digital to analog converter 102a converts the digitized current setting from the microcontroller 101 into an analog loop current. The amplifier 102b is operably coupled to the digital to analog converter 102a. The amplifier 102b amplifies the analog loop current received from the digital to analog converter 102a. The modulated Highway Addressable Remote Transducer (HART) analog signal is also summed at the amplifier 102b from the entry point Cin as exemplarily illustrated in FIG. 1. The voltage regulator 102c is operably coupled to the digital to analog converter 102a. The voltage regulator 102c regulates and maintains the voltage level of the HART soft modem device 100 at a constant level. The band pass filter 103 is operably coupled to the microcontroller 101 and the media access unit 102. The band pass filter 103 filters any out of band noise in the modulated HART analog signal.

The Highway Addressable Remote Transducer (HART) soft modem device 100 implements several techniques for lowering power consumption of the HART soft modem device 100. The HART soft modem device 100 incorporates energy detection, for example, by throttling the speed of the central processing unit (CPU) 101b of the HART soft modem device 100, when no HART analog signal is detected, and by using a direct memory access (DMA) controller 1000 exemplarily illustrated in FIG. 10, which can work without CPU intervention, thereby lowering power consumption of the CPU 101b. Since the CPU 101b is one of the biggest power consuming parts of the microcontroller 101, reducing utilization of the CPU 101b for modulation and demodulation operations can reduce the total power consumption of the HART soft modem device 100. The HART soft modem device 100 changes the speed of the CPU clock dynamically as the processing demand of the HART soft modem device 100 increases. The methods disclosed herein lower power consumption by more than about 50%.

Figure 2:
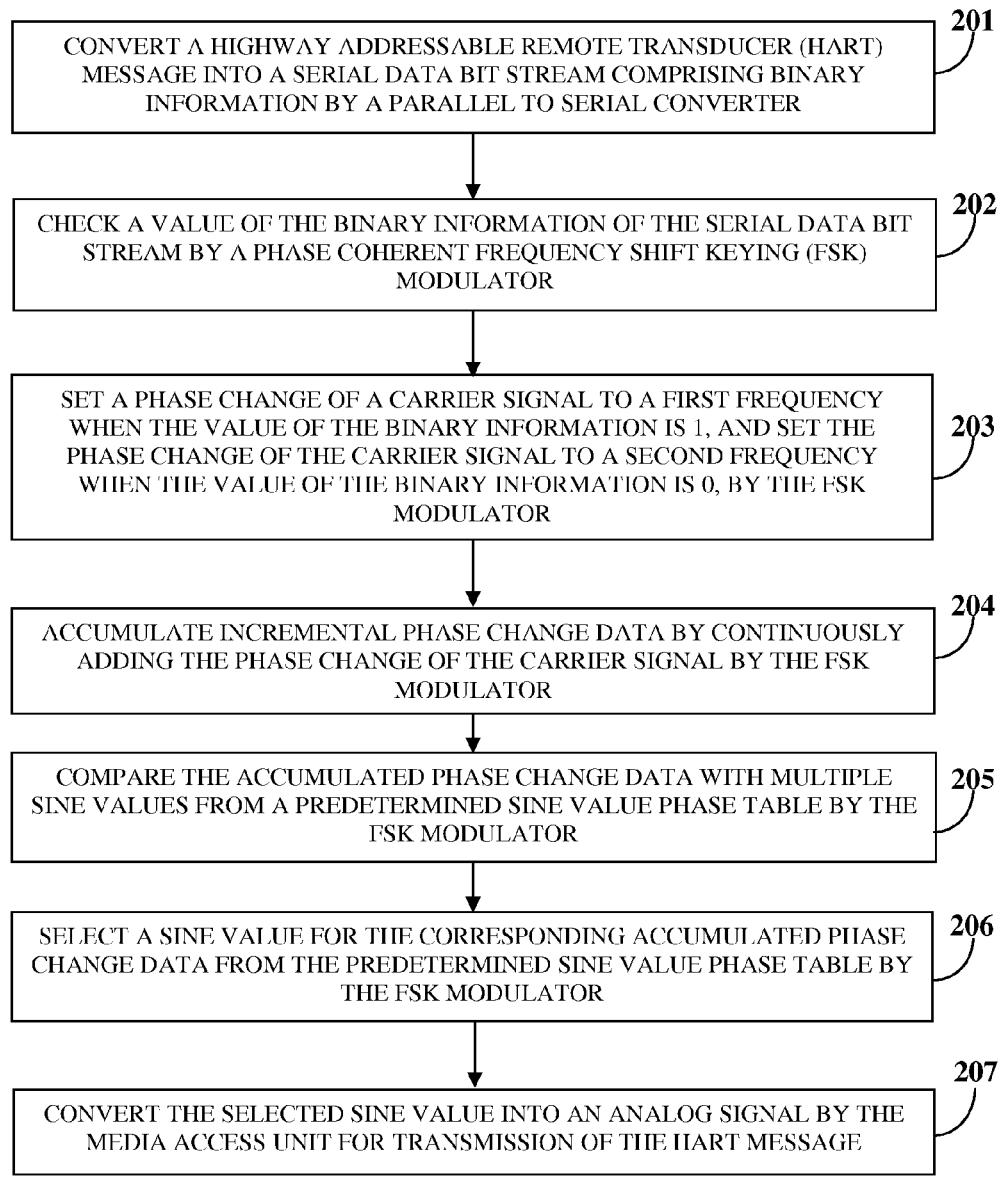
FIG. 2 illustrates a method for modulating and transmitting an analog signal comprising a Highway Addressable Remote Transducer message.

FIG. 2 illustrates a method for modulating and transmitting an analog signal comprising a Highway Addressable Remote Transducer (HART) message. The parallel to serial converter 101f of the HART soft modem device 100 exemplarily illustrated in FIG. 1, converts 201 the HART message into a serial data bit stream comprising binary information. The frequency shift keying (FSK) modulator 101d of the HART soft modem device 100 exemplarily illustrated in FIG. 1, checks 202 a value of the binary information of the serial data bit stream. The FSK modulator 101d sets 203 a phase change of a carrier signal to a first frequency when the value of the binary information is 1. The first frequency is, for example, 1200 hertz (Hz), and the phase change is, for example, about 45 degrees at a sampling rate of about 9600 Hz. The FSK modulator 101d sets 203 a phase change of the carrier signal to a second frequency when the value of the binary information is 0. The second frequency is, for example, 2200 Hz, and the phase change is, for example, about 82.5 degrees at a sampling rate of about 9600 Hz. The FSK modulator 101d accumulates 204 incremental phase change data by continuously adding the phase changes of the carrier signal. The FSK modulator 101d compares 205 the accumulated phase change data with multiple sine values from a predetermined sine value phase table shown in Table 1 below. The FSK modulator 101d selects 206 a sine value for the corresponding accumulated phase change data from the predetermined sine value phase table. The media access unit 102, in communication with the FSK modulator 101d via the serial peripheral interface 101c exemplarily illustrated in FIG. 1, converts 207 the selected sine value into an analog signal for transmission of the HART message. This output process can be performed with either a 1 to n bit digital to analog converter (DAC) 102a or a pulse width modulation (PWM) based DAC with an n bit precision, where n can be any integer value more than 1.

TABLE 1

Figure 3:
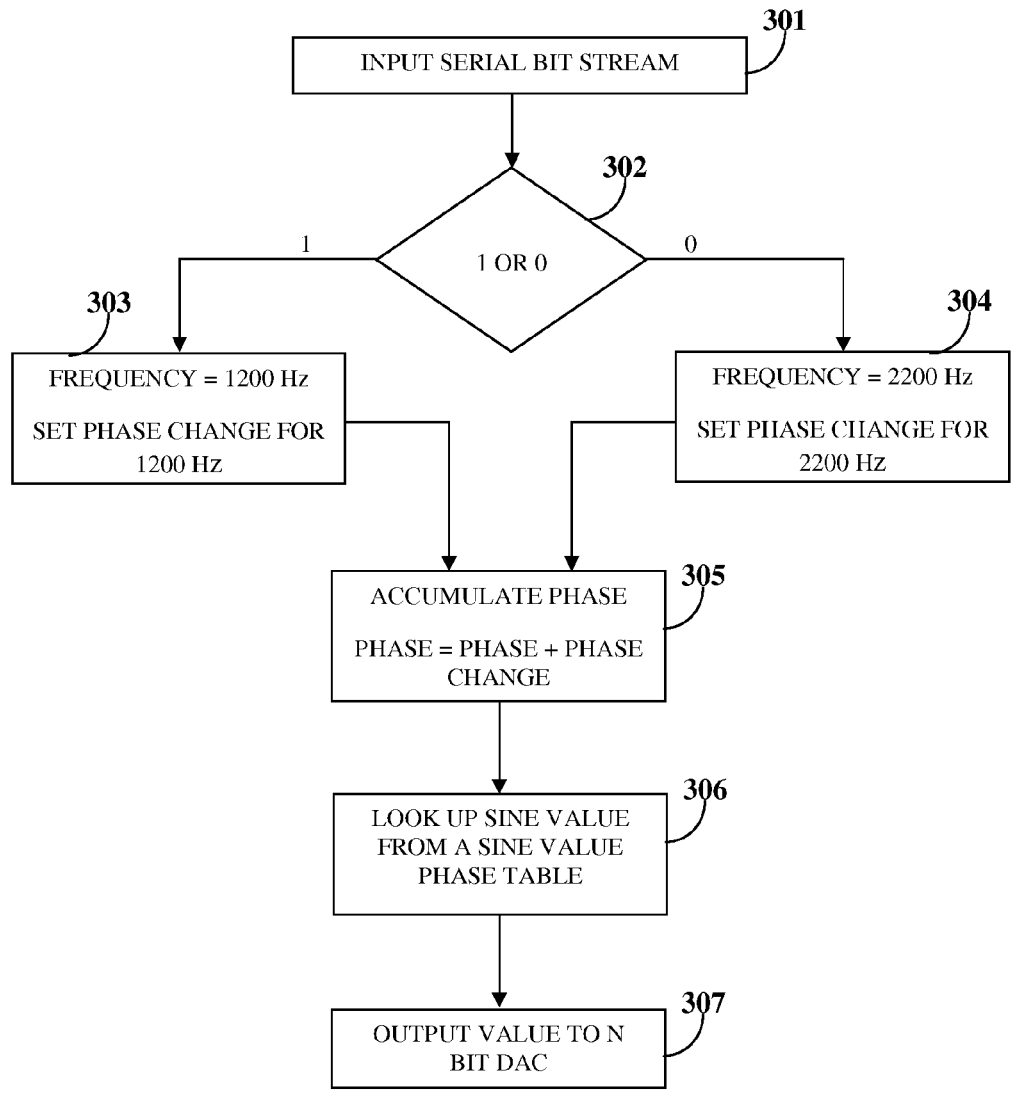
FIG. 3 illustrates a process flow diagram comprising the steps for modulating and transmitting an analog signal comprising a Highway Addressable Remote Transducer message.

Sine value phase table:

sintable[256] = {
0,3,6,9,12,15,18,21,24,28,31,34,37,40,43,46, \
48,51,54,57,60,63,65,68,71,73,76,78,81,83,85,88,\
90,92,94,96,98,100,102,104,106,108,109,111,112,114,115,117,\
118,119,120,121,122,123,124,124,125,126,126,127,127,127,127,127,\
127,127,127,127,127,127,126,126,125,124,124,123,122,121,120,119,\
118,117,115,114,112,111,109,108,106,104,102,100,98,96,94,92,\
90,88,85,83,81,78,76,73,71,68,65,63,60,57,54,51,\
48,46,43,40,37,34,31,28,24,21,18,15,12,9,6,3,\
0,−3,−6,−9,−12,−15,−18,−21,−24,−28,−31,−34,−37,−40,−43,−46,\
−48,−51,−54,−57,−60,−63,−65,−68,−71,−73,−76,−78,−81,−83,−85,−88,\
−90,−92,−94,−96,−98,−100,−102,−104,−106,−108,−109,−111,−112,−114,
−115,−117,\
−118,−119,−120,−121,−122,−123,−124,−124,−125,−126,−126,−127,−127,
−127,−127,−127,\
−127,−127,−127,−127,−127,−127,−126,−126,−125,−124,−124,−123,−122,
−121,−120,−119,\
−118,−117,−115,−114,−112,−111,−109,−108,−106,−104,−102,−100,−98,
−96,−94,−92,\
−90,−88,−85,−83,−81,−78,−76,−73,−71,−68,−65,−63,−60,−57,−54,−51,\
−48,−46,−43,−40,−37,−34,−31,−28,−24,−21,−18,−15,−12,−9,−6,−3
};

FIG. 3 illustrates a process flow diagram comprising the steps for modulating and transmitting an analog signal comprising a Highway Addressable Remote Transducer (HART) message. The frequency shift keying (FSK) modulator 101*d* of the HART soft modem device 100 exemplarily illustrated in FIG. 1, modulates and transmits analog signals comprising HART communications protocol messages. The parallel to serial converter 101*f* exemplarily illustrated in FIG. 1, converts the HART communications protocol messages into a serial bit stream 301 comprising binary information of 1 or 0. The FSK modulator 101*d* checks 302 every bit of the serial bit stream 301 for a 1 bit value or a 0 bit value. If the bit value is 1, then the FSK modulator 101*d* transmits or sends 303 a 1200 Hz carrier signal indicating a binary 1 as a transmitted bit and sets a phase change for 1200 Hz. If the bit value is 0, the FSK modulator 101*d* transmits or sends 304 a 2200 Hz carrier signal to indicate a binary 0 and sets a phase change for 2200 Hz.

The transmission of the 1200 Hz carrier signal or the 2200 Hz carrier signal is arrived at by accumulating 305 the incremental phase change representing the 1200 Hz or the 2200 Hz carrier signal and continuously summing the phase changes and performing a modulus of the accumulated phase with 360 representing 360 degrees in one full cycle of a sine wave. Further, in a digital implementation, the 360 degrees can be mapped to a convenient number by using the formula: 2 to the power of n, where n is an integer 1, 2, . . . , etc. The modulus operation can thus be simplified to a logic operation and can be effective in low power central processing unit (CPU) implementations. The result of the accumulated phase can be used to lookup 306 sine wave values in the sine value phase table, for example, Table 1 disclosed above that comprises pre-calculated values of the sine function. The result of the modulus operation is then outputted 307 to an n-bit digital to analog converter (DAC) 102*a* exemplarily illustrated in FIG. 1, or an n-bit pulse width modulation (PWM) based DAC.

The frequency shift keying (FSK) modulator 101*d* in the Highway Addressable Remote Transducer (HART) soft modem device 100 sends one of two different sine waves at 1200 Hz or 2200 Hz for a 1 or a 0 respectively. Further, when there is a change from 0 to 1 or from 1 to 0, the frequency also changes in a phase coherent manner, that is, there is no discontinuity in the phase of the transmitted signal. In the HART soft modem device 100 disclosed herein, the transmitted signal is outputted once every sample period, for example, either about 19200 Hz or about 9600 Hz or any other frequency depending on a specific implementation with the requirement that the frequency of the transmitted signal has to be 4 times more than the carrier frequency. In the case of the Bell 202 modem used in the HART soft modem device 100, the minimum sampling frequency is, for example, about 8800 Hz. The phase shift of the sine wave in one sample period can be calculated as: phase change=(2200 Hz or 1200 Hz/9600) times 360 degrees.

The phase change value is the amount of phase change which occurs from one sample to the next. The phase change value is accumulated and rolled over every 360 degrees, representing one full cycle of the sine wave. For the digital implementation suitable for the microcontroller 101 exemplarily illustrated in FIG. 1, a sine value phase table comprising 256 entries with sine values from 0 to 360 degrees divided equally 256 times is incorporated herein. Each entry in the sine value phase table is 360/256 degrees apart. A table lookup is performed in this sine value phase table for the currently accumulated phase of the modulated sine wave and a value is read. If the sine value is greater than 0, a 1 is outputted and for a value less than 0, a 0 is outputted. This digital output is similar to a 1 bit digital to analog converter (DAC). The digital output is further low pass filtered and transmitted as the Highway Addressable Remote Transducer (HART) analog signal. The sample frequency can be increased to about 19200 Hz or higher depending upon the noise measured in the final output. In an embodiment, if more precision is required, a pulse width modulation (PWM) based DAC can also be used for the output. This implementation results in a phase coherent frequency shift keying transmit signal.

Figure 4:
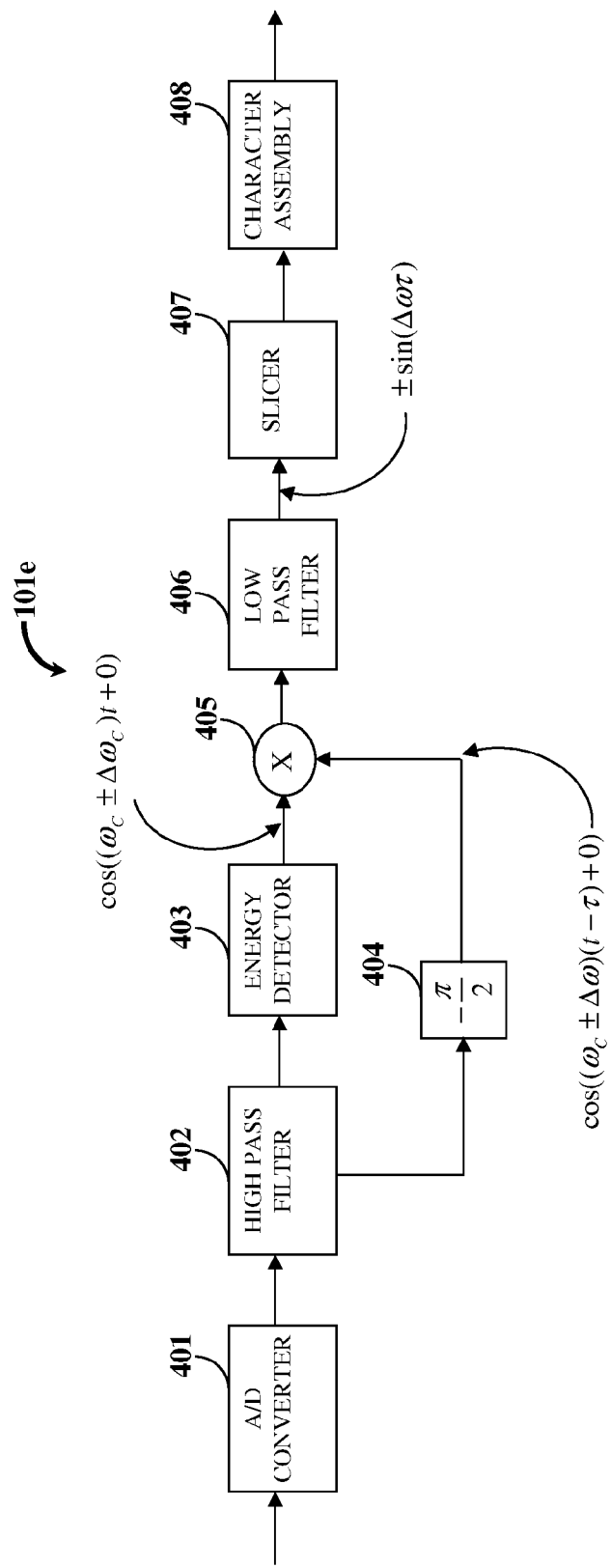
FIG. 4 exemplarily illustrates a block diagram of a phase coherent frequency shift keying demodulator of the Highway Addressable Remote Transducer soft modem device.

FIG. 4 exemplarily illustrates a block diagram of a phase coherent frequency shift keying (FSK) demodulator 101*e* of the Highway Addressable Remote Transducer (HART) soft modem device 100 exemplarily illustrated in FIG. 1. The FSK demodulator 101*e* comprises an analog to digital (A/D) converter 401, a high pass filter 402, an energy detector 403, a phase delay unit 404, a multiplier 405, a low pass filter 406, a decision maker or data slicer 407, and a character assembly unit 408. The A/D converter 401 samples the incoming analog signals and converts the analog signals into numbers or digitized analog samples for signal processing. The high pass filter 402 is operably coupled to the A/D converter 401. The high pass filter 402 removes any out of band noise signals arising due to current loop signaling from the digitized analog samples. The energy detector 403 is operably coupled to the high pass filter 402. The energy detector 403 implements an up down counting algorithm for determining when further processing of the digitized analog samples is required. The energy detector 403 further reduces power consumption of the HART soft modem device 100 by incorporating an energy detection method which throttles the master clock speed of the central processing unit (CPU) 101*b* of the microcontroller 101 exemplarily illustrated in FIG. 1, when no HART analog signal is present. The energy detector 403 also dynamically changes a clock of the CPU 101*b* as the processing demand of the HART soft modem device 100 increases.

The phase delay unit 404 is operably coupled to the high pass filter 402. The phase delay unit 404 introduces a predetermined phase delay, for example, a phase delay of n/2 in the digitized analog samples. The multiplier 405 is operably coupled to the energy detector 403 and the phase delay unit 404. The multiplier 405 multiplies the digitized analog samples from the energy detector 403 with the phase shifted digitized analog samples from the phase delay unit 404. The low pass filter 406 is operably coupled to the multiplier 405. The low pass filter 406 suppresses unwanted frequency components or noise signals in the digitized analog samples. The low pass filter 406 attenuates the digitized analog samples and removes short term fluctuations in the digitized analog samples. The data slicer 407 is operably coupled to the low pass filter 406. The data slicer 407 dynamically determines the optimum slicing point, that is, the optimum magnitude from the digitized analog samples with which to delineate between a binary 1 and 0 in the digitized analog samples. The data slicer 407 determines whether the frequency of the digitized analog samples exceeds a predetermined decision point value. The decision point value is selected between the frequency values representing "0", that is, 2200 Hz, and "1", that is, 1200 Hz. The character assembly unit 408 is operably coupled to the data slicer 407. The character assembly unit 408 performs character generation and bit synchronization of the digitized analog samples. The resulting byte stream is used for further Highway Addressable Remote Transducer (HART) protocol handling.

Figure 5:
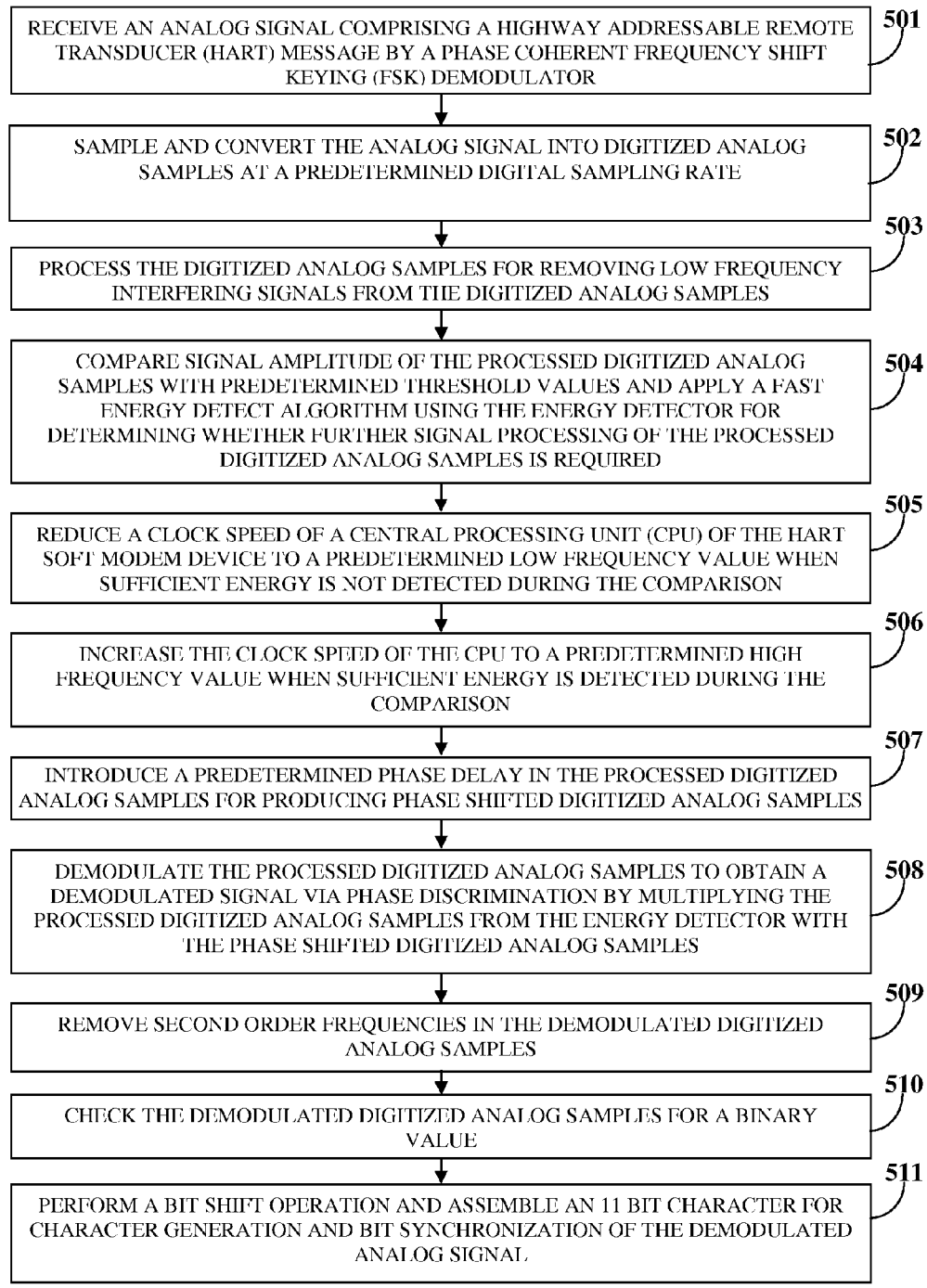
FIG. 5 illustrates a method for receiving and demodulating an analog signal comprising a Highway Addressable Remote Transducer message.

FIG. 5 illustrates a method for receiving and demodulating an analog signal comprising a Highway Addressable Remote Transducer (HART) message. The frequency shift keying (FSK) demodulator 101e of the HART soft modem device 100 exemplarily illustrated in FIG. 1 and FIG. 4, receives 501 an analog signal comprising a HART message. The FSK demodulator 101e samples and converts 502 the analog signal into digitized analog samples at a predetermined digital sampling rate. The predetermined digital sampling rate or sampling frequency is, for example, about 9600 Hz or about 19200 Hz. The FSK demodulator 101e processes 503 the digitized analog samples for removing low frequency interfering signals from the digitized analog samples. The FSK demodulator 101e compares 504 the signal amplitude of the processed digitized analog samples with predetermined threshold values and applies a fast energy detect algorithm using the energy detector 403 exemplarily illustrated in FIG. 4, for determining whether further signal processing of the processed digitized analog samples is required. The FSK demodulator 101e reduces 505 a clock speed of a central processing unit (CPU) 101b of the HART soft modem device 100 exemplarily illustrated in FIG. 1, to a predetermined low frequency value when sufficient energy is not detected in the processed digitized analog samples during the comparison. The predetermined low frequency value is, for example, 1 MHz.

The frequency shift keying (FSK) demodulator 101e increases 506 the clock speed of the central processing unit (CPU) 101b of the Highway Addressable Remote Transducer (HART) soft modem device 100 to a predetermined high frequency value, when sufficient energy is detected in the processed digitized analog samples during the comparison. The predetermined high frequency value is, for example, 4 MHz. The FSK demodulator 101e introduces 507 a predetermined phase delay in the processed digitized analog samples for producing phase shifted digitized analog samples. The HART soft modem device 100 maintains a HART communications protocol timing by using separate clocks for the CPU 101b and peripherals of the HART soft modem device 100. The FSK demodulator 101e demodulates 508 the processed digitized analog samples to obtain a demodulated analog signal via phase discrimination by multiplying the processed digitized analog samples from the energy detector 403 with the phase shifted digitized analog samples. The FSK demodulator 101e removes 509 second order frequencies in the demodulated digitized analog samples. The FSK demodulator 101e checks 510 the demodulated digitized analog samples for a binary value. A positive demodulated digitized analog sample represents a 1 and a negative demodulated digitized analog sample represents a 0. The FSK demodulator 101e performs 511 a bit shift operation and assembles an 11 bit character for character generation and bit synchronization of the demodulated analog signal. In an embodiment, the FSK demodulator 101e turns off or deactivates the CPU 101b of the HART soft modem device 100 and uses direct memory access to handle digital signal processing functions which involve repetitive multiplication and/or accumulation and data shift operations.

Figure 6:
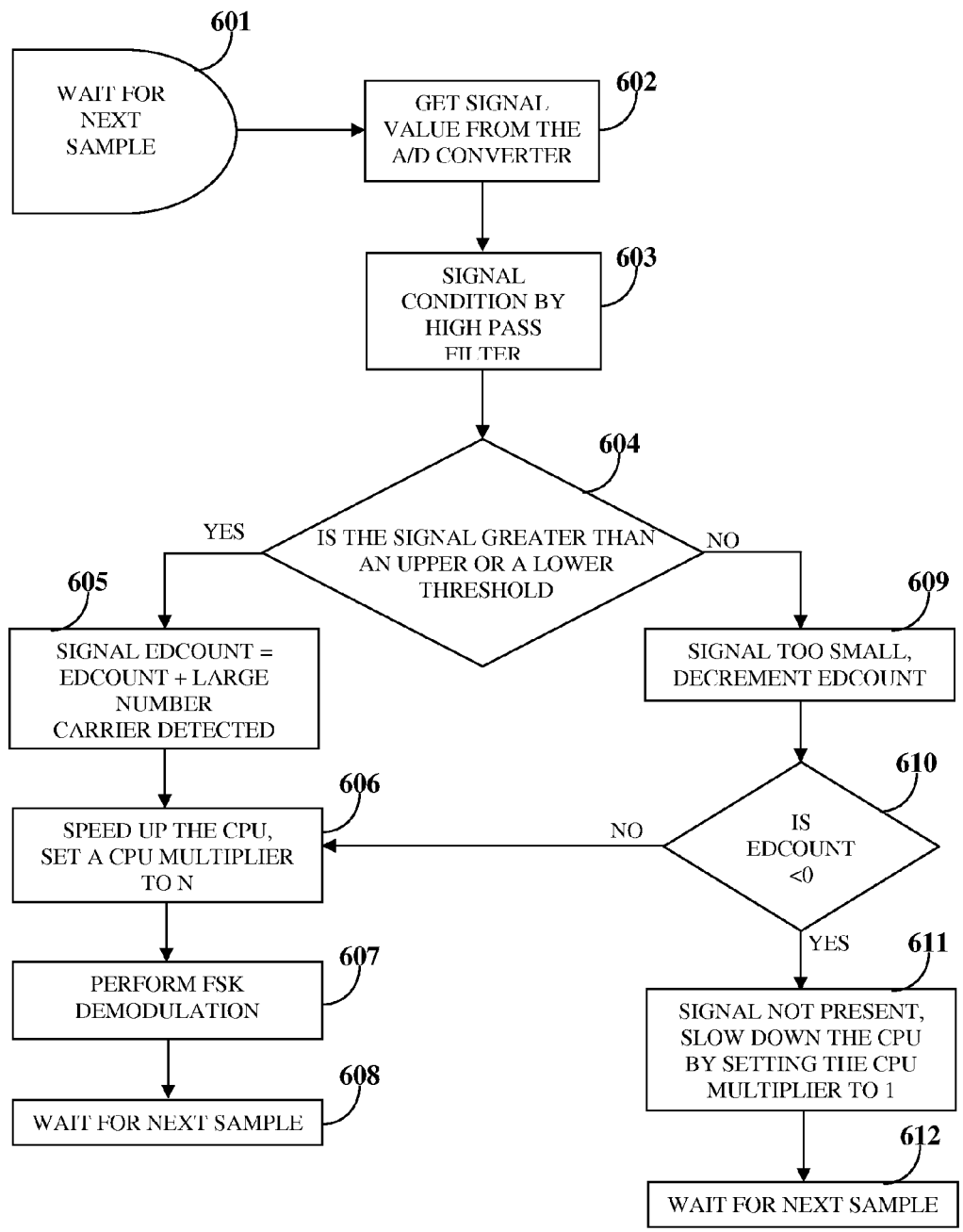
FIG. 6 illustrates a process flow diagram comprising the steps for receiving and demodulating an analog signal comprising a Highway Addressable Remote Transducer message.

FIG. 6 illustrates a process flow diagram comprising the steps for receiving and demodulating an analog signal comprising a Highway Addressable Remote Transducer (HART) message. The frequency shift keying (FSK) demodulator 101e of the HART soft modem device 100 exemplarily illustrated in FIG. 1, receives an FSK analog signal containing the HART message. The FSK demodulator 101e receives the FSK analog signal and converts the received FSK analog signal into digitized analog samples using the analog to digital (A/D) converter 401 exemplarily illustrated in FIG. 4, at a predetermined digital sampling rate. The high pass filter 402 exemplarily illustrated in FIG. 4, for example, a high pass digital finite impulse response filter of the FSK demodulator 101e waits 601 for a digitized analog sample and receives or gets 602 the signal sample value or the digitized analog samples from the A/D converter 401.

The high pass filter 402 performs signal conditioning 603 by processing the received signal sample value or digitized analog samples to remove low frequency interfering signals from the current loop signaling as required by the Highway Addressable Remote Transducer (HART) physical layer specification. The frequency shift keying (FSK) demodulator 101e checks 604 whether further signal processing is required by comparing the signal amplitude of the digitized analog samples with predetermined threshold values and applying the fast energy detect algorithm using the energy detector 403 exemplarily illustrated in FIG. 4. The predetermined threshold values comprise a predetermined upper threshold value and a predetermined lower threshold value. If the signal amplitude of the digitized analog samples is greater than the predetermined threshold values, the FSK demodulator 101e detects the presence of a valid HART analog signal and sets 605 the signal energy detect count (EDCOUNT) value to a large value. The FSK demodulator 101e speeds up 606 the central processing unit (CPU) 101b exemplarily illustrated in FIG. 1, n times and sets the CPU clock divide register. The FSK demodulator 101e performs 607 FSK demodulation through a phase discrimination method by multiplying the output of the high pass filter 402 and a 90 degree phase delayed version of the same. The FSK demodulator 101e then waits 608 for the next sample signal.

If the sample signal is too small and sufficient energy is not detected, the frequency shift keying (FSK) demodulator 101e decrements 609 the energy detect count value. If the energy detect count value is less than zero 610, the FSK demodulator 101e detects that a valid Highway Addressable Remote Transducer (HART) analog signal is not present 611 and reduces the speed of the CPU 101b by reducing the CPU frequency to a low frequency value, setting the CPU multiplier to 1, and changing the setting of the CPU 101b to a low power mode to conserve total power needed for the HART soft modem device 100. The FSK demodulator 101e then waits 612 for the next sample signal. If the energy detect count value is not less than zero, the FSK demodulator 101e speeds up 606 the CPU 101b n times and sets the CPU clock divide register and proceeds as disclosed above.

Figure 7:
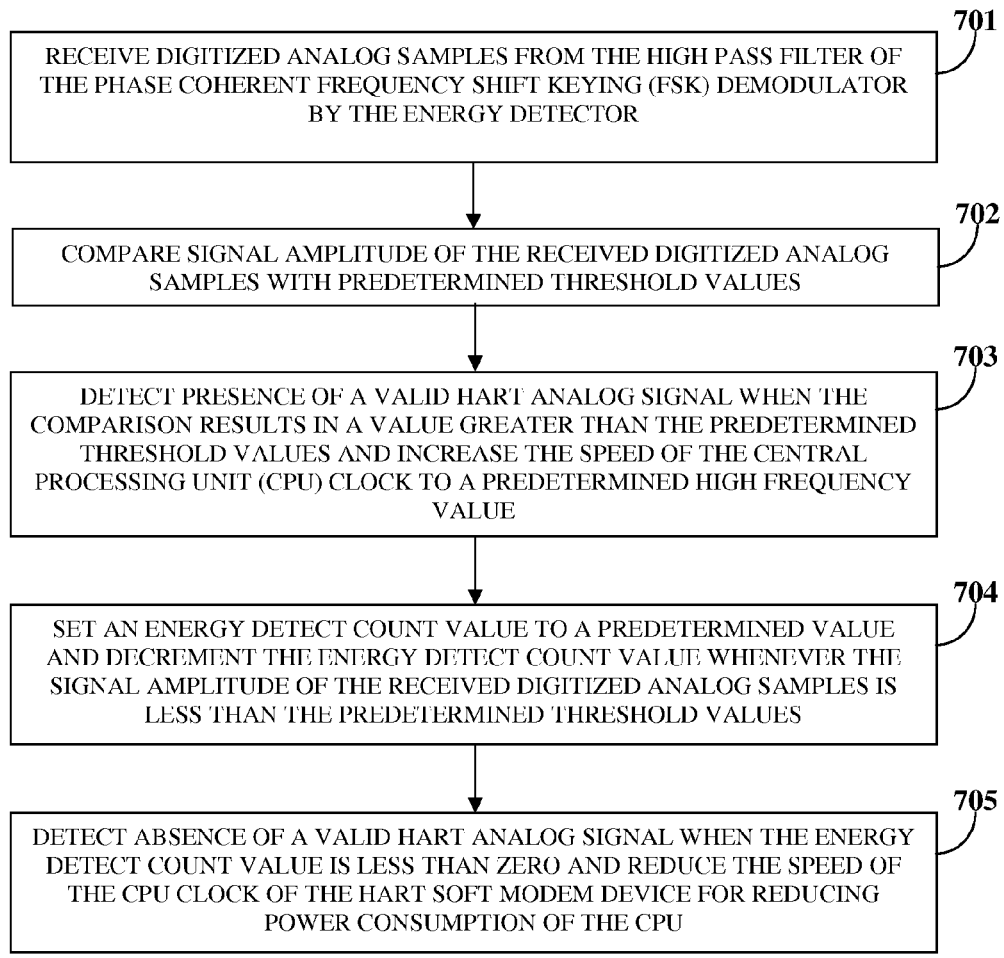
FIG. 7 illustrates a method for performing energy detection and determining speed of a central processing unit clock of the Highway Addressable Remote Transducer soft modem device.
Figure 11:
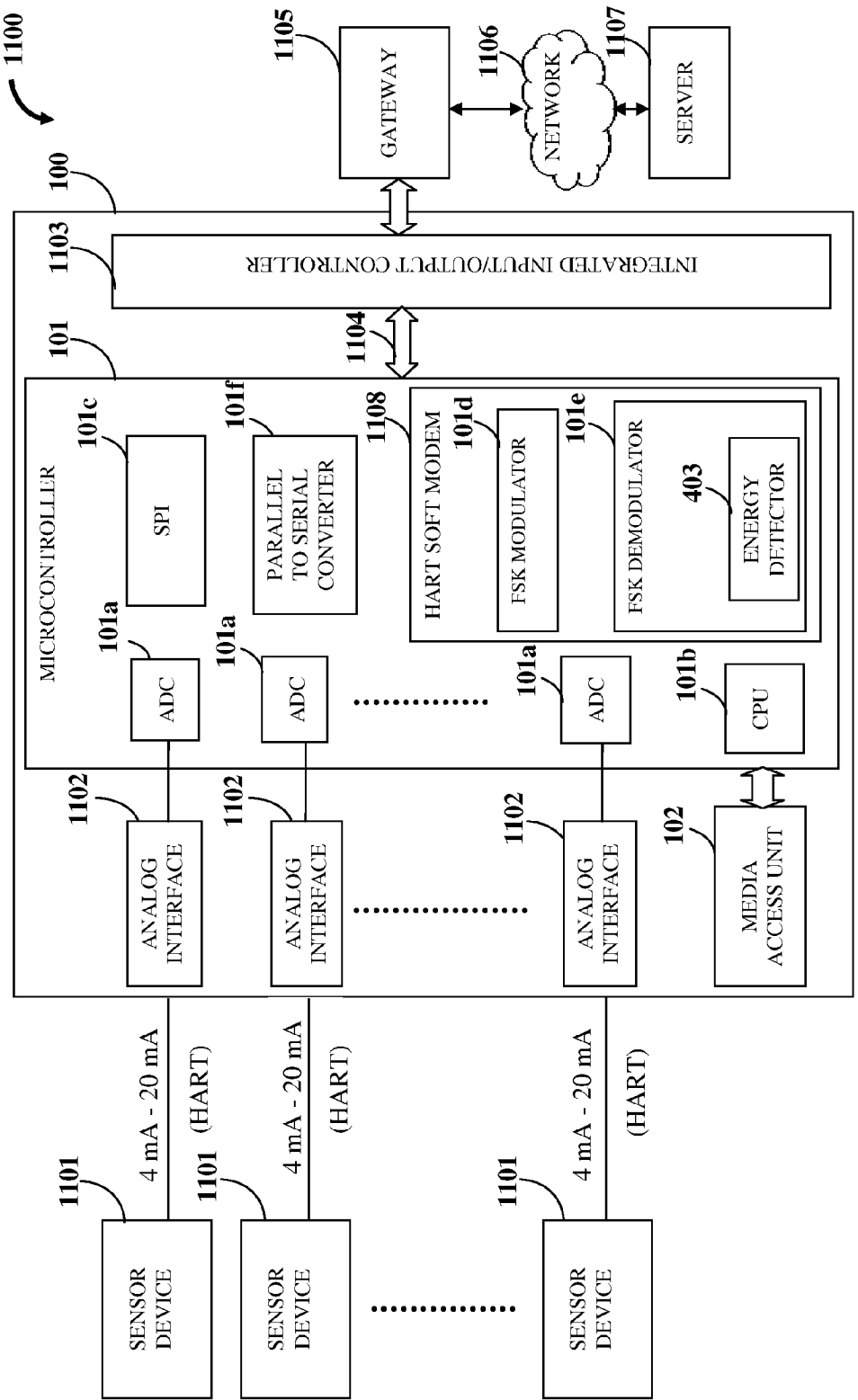
FIG. 11 exemplarily illustrates a block diagram of an embodiment of the Highway Addressable Remote Transducer soft modem device.

FIG. 7 illustrates a method for performing energy detection and determining speed of a central processing unit (CPU) clock of the Highway Addressable Remote Transducer (HART) soft modem device 100 exemplarily illustrated in FIG. 1 and FIG. 11. As exemplarily illustrated in FIG. 11, a single microcontroller 101 is integrated with a HART soft modem 1108 comprising the frequency shift keying (FSK) modulator 101d and the FSK demodulator 101e. In the embodiment exemplarily illustrated in FIG. 11, the single microcontroller 101 runs multiple instances of the HART soft modem 1108. The FSK demodulator 101e of the HART soft modem device 100 exemplarily illustrated in FIG. 1 and FIG. 11, comprises the high pass filter 402 and the energy detector 403 as exemplarily illustrated in FIG. 4 and as disclosed in the detailed description of FIG. 4. The energy detector 403 receives 701 digitized analog samples from the high pass filter 402. The energy detector 403 compares 702 signal amplitude of the received digitized analog samples with predetermined threshold values. The energy detector 403 detects 703 presence of a valid HART analog signal when the comparison results in a value greater than the predetermined threshold values, and increases the speed of the CPU clock of the HART soft modem device 100 to a predetermined high frequency value. The energy detector 403 sets 704 an energy detect count value to a predetermined value and decrements the energy detect count value whenever the signal amplitude of the received digitized analog samples is less than the predetermined threshold values. The energy detector 403 detects 705 absence of a valid HART analog signal when the energy detect count value is less than zero and reduces the speed of the CPU clock of the HART soft modem device 100 for reducing the power consumption of the CPU 101b exemplarily illustrated in FIG. 1 and FIG. 11.

Figure 8:
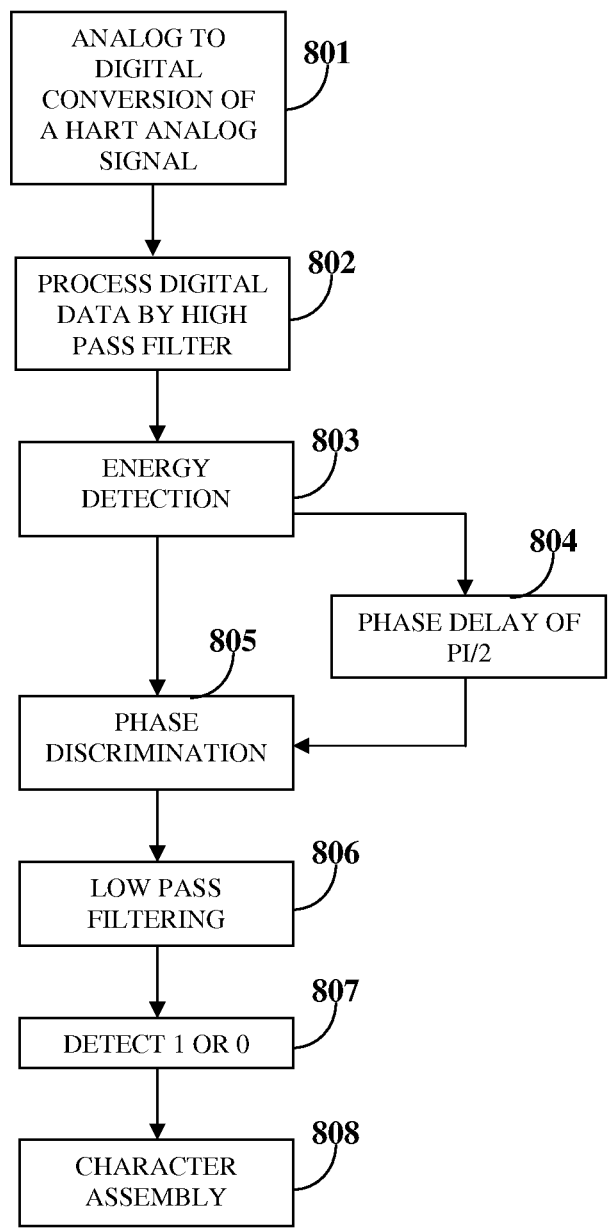
FIG. 8 illustrates a process flow diagram comprising the steps for demodulating an analog signal comprising a Highway Addressable Remote Transducer message.

FIG. 8 illustrates a process flow diagram comprising the steps for demodulating an analog signal comprising a Highway Addressable Remote Transducer (HART) message. The energy detector 403 exemplarily illustrated in FIG. 4, of the FSK demodulator 101e of the HART soft modem device 100 exemplarily illustrated in FIG. 1 and FIG. 11, performs energy detection and throttles the speed of the CPU 101b exemplarily illustrated in FIG. 1 and FIG. 11, based on the detected energy value. The FSK demodulator 101e performs an analog to digital conversion 801 of the HART analog signal using the analog to digital (A/D) converter 401 exemplarily illustrated in FIG. 4, and processes 802 the digitized analog samples using the high pass filter 402 exemplarily illustrated in FIG. 4. The energy detector 403 of the FSK demodulator 101e performs energy detection 803 by inspecting and comparing the output of the high pass filter 402 with predetermined upper and lower threshold values. The energy detector 403 decides that a valid HART analog signal is present when the high pass filter 402 output is greater than the predetermined threshold values.

The energy detector 403 sets a large energy detect count value which is decremented whenever the output signal of the high pass filter 402 is less than the predetermined threshold values. When this energy detect count value becomes less than zero, the energy detector 403 decides that the Highway Addressable Remote Transducer (HART) analog signal is no longer present and throttles down the central processing unit (CPU) 101b by setting the CPU clock divider to 2, 4, 8, or n, typically 4, to slow down the CPU 101b to conserve power or lower power consumption. When sufficient energy is detected, the energy detector 403 speeds up the CPU 101b by setting the CPU clock divider to 1 to speed up the CPU 101b, so that the CPU 101b runs at the maximum speed and performs further processing of the received signal through the frequency shift keying (FSK) demodulator 101e.

While throttling the CPU clock speed for Highway Addressable Remote Transducer (HART) protocol transmission, the HART soft modem device 100 ensures that there is no timing change in the other components of the HART soft modem device 100. The HART soft modem device 100 maintains HART communications protocol timing by implementing a HART communications protocol software and by using separate clocks for peripherals and the CPU 101b so that when the CPU clock divider is set to 2, 4, 8, etc., typically, 4, to slow down the CPU 101b to conserve power, the system software timer which typically runs off the hardware based timers are not affected by the CPU clock changes. For example, in an implementation of the HART soft modem device 100 based on Texas Instruments MSP430 family of microprocessors, the master clock (MCLK) is used by the CPU 101b whereas the peripherals such as the timer, analog to digital converters, etc., use the auxiliary clock (ACLK). This method reduces the complexity of the HART communications protocol software by not affecting HART communications protocol timers.

The frequency shift keying (FSK) demodulator 101e performs FSK demodulation through a phase discrimination method 805 by multiplying the output of the high pass filter 402 and 90 degree phase delayed version 804 of the same. The FSK demodulator 101e applies 806 a low pass filter 406 exemplarily illustrated in FIG. 4, to the digitized analog samples to remove the second order frequencies at 2Wc. The FSK demodulator 101e then detects 807 whether a 1 or 0 was received by looking at the output of the low pass filter 406, where a positive number represents 1 and a negative number represents 0. The FSK demodulator 101e further shifts these bits through a software based shift register and assembles an 11 bit character 808 with 1 start, 8 data, 1 parity, and 1 stop bit as specified in the Highway Addressable Remote Transducer (HART) protocol standards.

Figure 9:
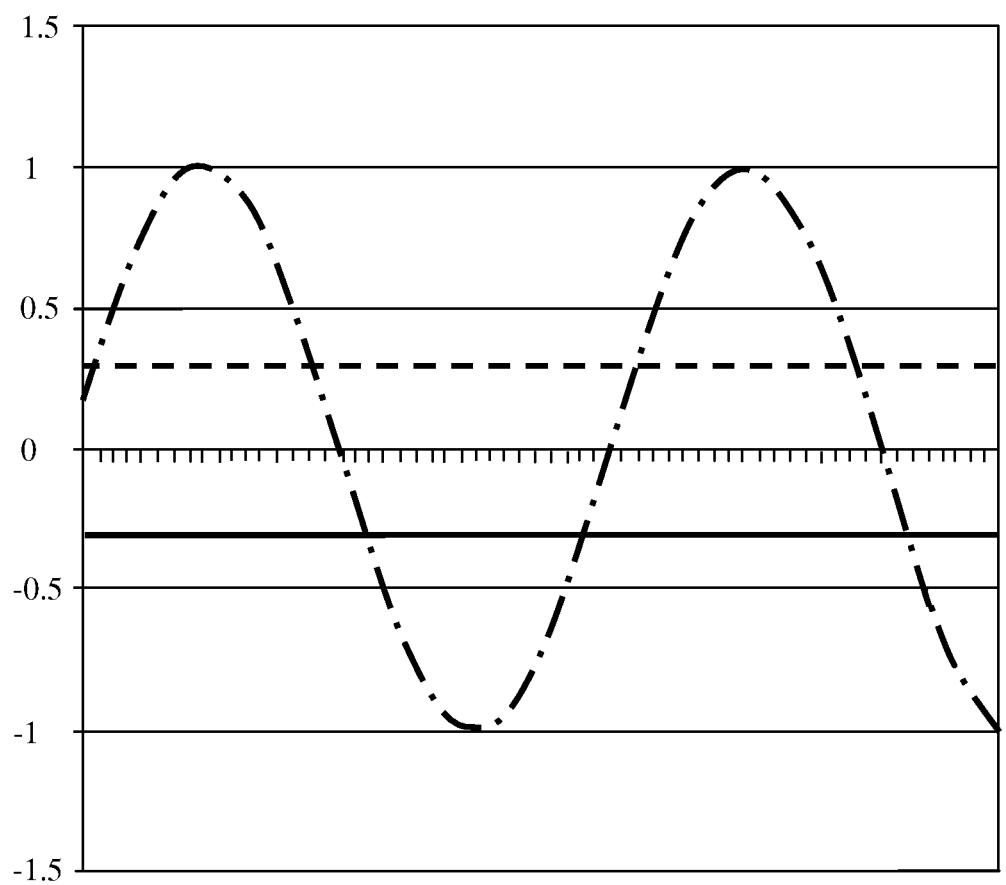
FIG. 9 exemplarily illustrates a graphical representation of a relationship between a transmitted signal and threshold values of the Highway Addressable Remote Transducer soft modem device.

FIG. 9 exemplarily illustrates a graphical representation of a relationship between a transmitted signal and threshold values of the Highway Addressable Remote Transducer (HART) soft modem device 100 exemplarily illustrated in FIG. 1. The HART soft modem device 100 disclosed herein provides a more accurate modulation, transmission, and demodulation of the analog signals using digital signal processing algorithms. Since these methods are computationally more intensive, distinctive algorithms are utilized for energy detection and for speed throttling of the central processing unit (CPU) 101b of the microcontroller 101 exemplarily illustrated in FIG. 1, to ensure that the speed of the CPU 101b is increased only when needed. Since the duty cycle, that is, the communication on-time versus off-time of a typical HART communication is less than 50%, the methods disclosed herein result in lowering of the total power consumption of the HART soft modem device 100 by about 50%.

The Highway Addressable Remote Transducer (HART) soft modem device 100 disclosed herein utilizes an up down counter method. In this method, if the analog signal amplitude is above the predetermined threshold values, a large up count value is added, and whenever the analog signal is within the threshold values, a much smaller down count value is subtracted. This method facilitates fast energy detection and a slower detection of energy decay. The carrier detect or energy detector 403 exemplarily illustrated in FIG. 4, responds within 2 sine wave cycles, which is, for example, about 1.66 milliseconds (ms) in the HART soft modem device 100. The relationship between the analog signal and the threshold values relative to each other is exemplarily illustrated in FIG. 9. The exact values of the signal and threshold values can vary depending on each configuration of the HART soft modem device 100 and configuration parameters.

A pseudocode and the values selected in an embodiment of the Highway Addressable Remote Transducer (HART) soft modem device 100 are shown below:
if((fsksignal)>upperthreshold|
(fsksignal<lowerthreshold))
{energydetectcount+=largecount;
If(energydetectcount>somecount)carrierdetect=1;
}
else edcount--;
if(edcount<0) {
edcount=-1; carrierdetect=0;
goto enddemod; // no carrier present. Exit demod routine
}

The central processing unit (CPU) 101b of the microcontroller 101 requires a frequency cycle of, for example, about 1 MHz or less in order to perform analog signal sampling and energy detection. Hence, the Highway Addressable Remote Transducer (HART) soft modem device 100 runs as a default at 1 MHz. Once the energy detect threshold is reached, indicating that a carrier signal is present, the speed of a master clock of the CPU 101b is increased to initiate the rest of the processing of the FSK demodulator 101e exemplarily illustrated in FIG. 1 and FIG. 4, so that a transmitted message can be decoded. For example, in the HART soft modem device 100 implemented using the MSP430 microcontroller, the speed of the CPU master clock (MCLK) is increased from 1 MHz to 4 MHz, which is a sufficient processing power for operating the FSK demodulator 101e. Since the duty cycle of the HART receiver or control device is less than 50%, this method results in 50% power reduction. The pseudocode showing energy detection and CPU clock multiplier setting is shown below:

```
if ((fsksignal) > upperthreshold || (fsksignal < lowerthreshold))
    {energydetectcount+=largecount;carrierdetect=1;
        // Carrier is detected, speed up the CPU
        UCSCTL5 &= !(DIVM2);    // set CPU clock divider to 1. Speed
    up the CPU.
        }
else edcount—;
if(edcount<0){
    edcount=-1;carrierdetect=0;
    UCSCTL5 |= DIVM2;         // No signal, set CPU clock divider to 4.
Slow down the CPU
    goto enddemod;            // no carrier present. Exit demod routine
    }
```

Figure 10:
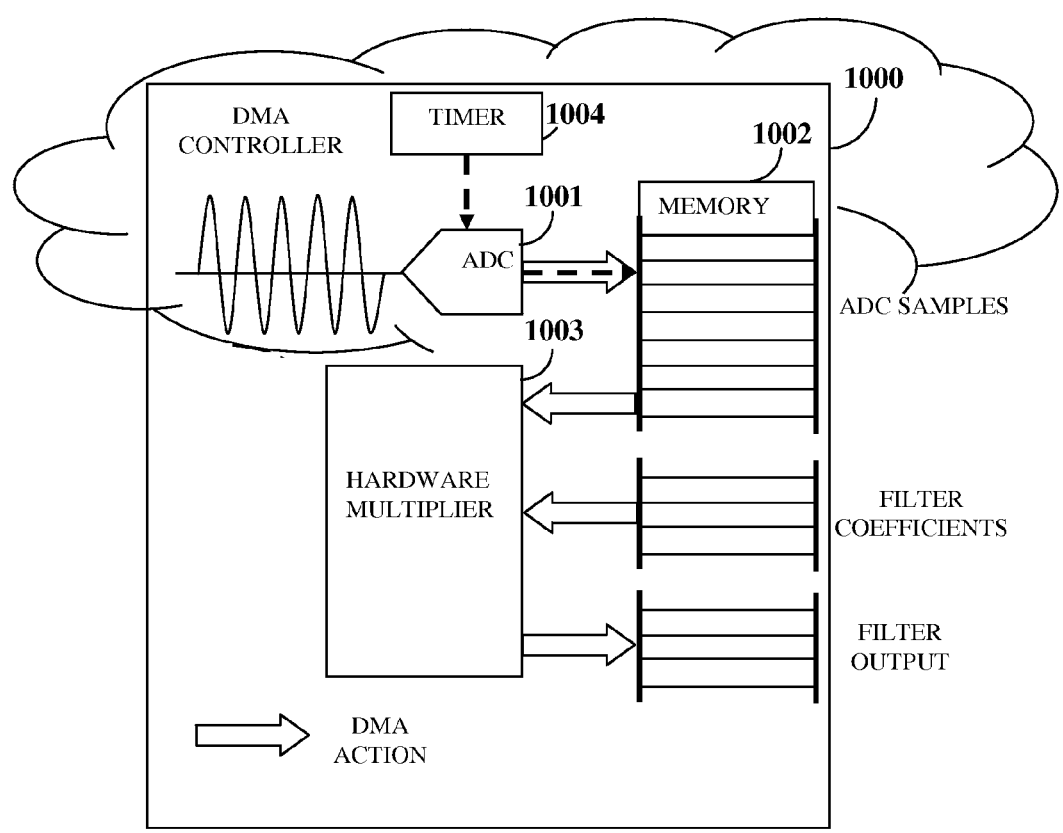
FIG. 10 exemplarily illustrates a flow diagram showing a method for reducing operating power using a direct memory access controller of the Highway Addressable Remote Transducer soft modem device.

FIG. 10 exemplarily illustrates a flow diagram showing a method for reducing operating power using a direct memory access (DMA) controller 1000 of the Highway Addressable Remote Transducer (HART) soft modem device 100 exemplarily illustrated in FIG. 1 and FIG. 11. The HART soft modem device 100 comprises the DMA controller 1000 configured to reduce power consumption of the HART soft modem device 100. In the HART soft modem device 100 disclosed herein, the central processing unit (CPU) 101b of the microcontroller 101 exemplarily illustrated in FIG. 1 and FIG. 11, processes the analog signal only about every 0.5 milliseconds (ms). The longer the CPU 101b remains in a low power mode, the lower the total power consumption. The processing of the received analog signal and application of linear multiply algorithms is streamlined with a sequence of DMA operations. The DMA controller 1000 disclosed herein comprises an analog to digital converter (ADC) 1001, a memory unit 1002, a hardware multiplier 1003, and a timer 1004. The DMA operations comprise converting the analog signal to digitized analog samples using the ADC 1001 and storing the digitized analog samples in the memory unit 1002, followed by transferring the digitized analog samples from the memory unit 1002 to the hardware multiplier 1003 and back to the memory unit 1002, followed by a memory-to-memory data move. This pipelining of the DMA process minimizes the need for CPU operation and thus lowers power consumption by the CPU 101b.

The analog to digital conversion operation of the analog to digital converter (ADC) 1001 is triggered by the timer 1004 since the conversion is performed periodically at about 9600 times a second. The converted analog sample is directly sent to the memory unit 1002. Subsequent multiplication and/or accumulation between the digitized analog samples and filter coefficients of the low pass filter 406 exemplarily illustrated in FIG. 4, and/or data shift operations required by the frequency shift keying (FSK) demodulator 101e exemplarily illustrated in FIG. 1, FIG. 4, and FIG. 11, are sequenced in the direct memory access (DMA) controller 1000 using DMA sequences. The filter coefficients and the digitized analog samples become the two inputs to the hardware multiplier 1003 and the output of the hardware multiplier 1003 becomes the low pass filter output. CPU intervention is only required for the final decision and the character assembly process. The DMA sequences are exemplarily illustrated in FIG. 10. This DMA process results in a significant reduction in CPU utilization and thus makes the Highway Addressable Remote Transducer (HART) soft modem device 100 more effective.

FIG. 11 exemplarily illustrates a block diagram of an embodiment of the Highway Addressable Remote Transducer (HART) soft modem device 100 exemplarily illustrated in FIG. 1. FIG. 11 shows a control system 1100, for example, an industrial automation and control system comprising the HART soft modem device 100 in operable communication with multiple sensor devices 1101 via multiple analog interfaces 1102 of the HART soft modem device 100. The HART soft modem device 100 comprises a single microcontroller 101, for example, a mixed signal microcontroller such as the MSP430 microcontroller of Texas Instruments, in operable communication with an integrated input/output (I/O) controller 1103 over a single communication channel 1104. In an embodiment, this communication channel 1104 is a universal asynchronous receiver/transmitter (UART) based serial line running at baud rates, for example, higher than 9600 bits per second (bps) to allow data from multiple channels, for example, data received from multiple sensor devices 1101 to be sent and received over a single line, for example, to/from a server 1107 via a gateway 1105 over a network 1106. The network 1106 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks. In another embodiment, the communication channel 1104 is a serial peripheral interface (SPI) based communication channel running at several hundred Kilo Hertz (KHz) for multiplexed communication at high data transfer speeds. In another embodiment, the communication channel 1104 is an inter-integrated circuit ($I^2C$) based communication channel decided based on $I^2C$ addresses. The microcontroller 101 uses $I^2C$ addresses to select the communication channel 1104. For example, an $I^2C$ address of 0 will direct the communication to channel 0, an address of 1 will direct the communication to channel 2, etc. Thus, on a pair of two wires, multiple channel communication can be achieved.

The highway addressable remote transducer (HART) soft modem device 100 further comprises multiple analog interfaces 1102, a media access unit 102, and a HART soft modem 1108 integrated within the single microcontroller 101. The HART soft modem 1108 comprises a phase coherent frequency shift keying (FSK) modulator 101*d* and a phase coherent frequency shift keying (FSK) demodulator 101*e*. The single microcontroller 101 comprises multiple analog to digital converters 101*a*, one or more processors, for example, a central processing unit (CPU) 101*b*, a serial peripheral interface (SPI) 101*c*, and a parallel to serial converter 101*f*. Due to the multiple analog to digital converters 101*a* contained in the single microcontroller 101 of the HART soft modem device 100 exemplarily illustrated in FIG. 11, the single microcontroller 101 can implement and run multiple instances of the HART soft modem 1108, without including multiple electronic circuits for each instance of the HART soft modem 1108.

The highway addressable remote transducer (HART) soft modem 1108 is in operable communication with the analog to digital converters 101*a*, the serial peripheral interface 101*c*, and the parallel to serial converter 101*f* in the single microcontroller 101 and with the media access unit 102. The analog to digital converters 101*a* are configured to communicate with the sensor devices 1101 via respective analog interfaces 1102. The analog to digital converters 101*a* available in the single microcontroller 101 receive multiple analog signals from the sensor devices 1101 via the respective analog interfaces 1102. For example, the analog to digital converters 101*a* listen to multiple analog channels via their respective analog interfaces 1102 and demodulate the received analog signals comprising HART messages. Consider an example where the single microcontroller 101 is a mixed signal microcontroller such as the MSP430 microcontroller of Texas Instruments with an 8 channel 12 bit analog to digital converter port. Using this 8 channel 12 bit analog to digital converter port, the single microcontroller 101 can implement eight instances of the HART soft modem 1108, that is, modulate and/or demodulate up to eight analog signals comprising HART messages, without including additional circuitry required for realization of eight HART modems.

In an embodiment, the Highway Addressable Remote Transducer (HART) soft modem device 100 can consolidate commonly used resources comprising, for example, sine tables, filter coefficients, demodulator functions, low pass filter functions, digital memory access (DMA), etc., in the single instance implementation of the HART soft modem 1108 for an efficient use of resources. Implementation of multiple instances of the HART soft modem 1108 in a single thread minimizes process overhead, for example, interrupt service routines, context save and restore, etc., thereby decreasing speed requirement and power consumption of the central processing unit (CPU) 101*b* and optimizing CPU utilization. Greater the optimization of the CPU utilization, greater is the number of instances of the HART soft modem 1108 that can be implemented in the single microcontroller 101. Thus, the optimized CPU utilization facilitates running a maximum number of instances of the HART soft modem 1108 with a given CPU speed.

Figure 12:
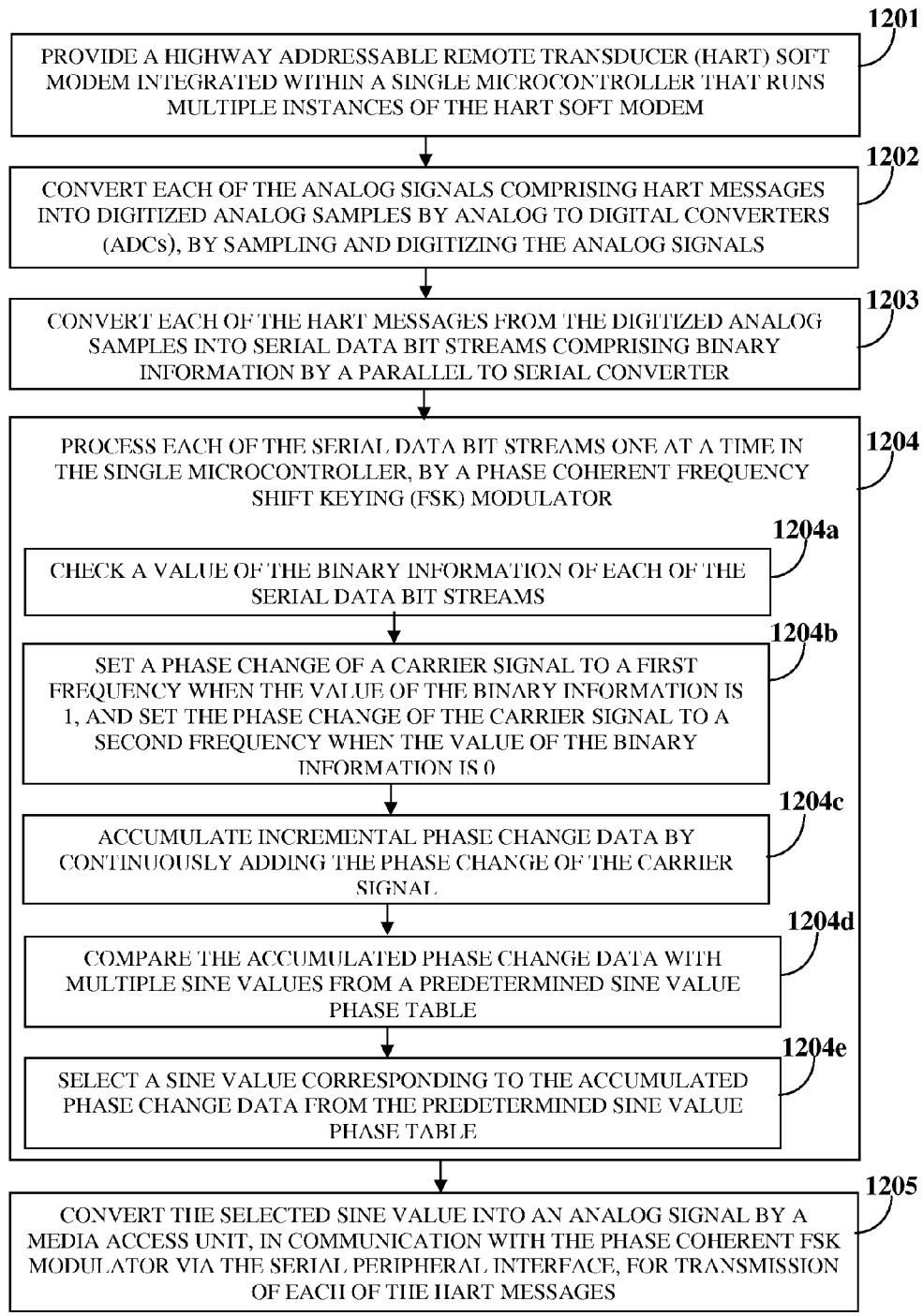
FIG. 12 illustrates an embodiment of the method for modulating and transmitting multiple analog signals comprising Highway Addressable Remote Transducer messages using the Highway Addressable Remote Transducer soft modem device exemplarily illustrated in FIG. 11.

FIG. 12 illustrates an embodiment of the method for modulating and transmitting multiple analog signals comprising Highway Addressable Remote Transducer (HART) messages using the HART soft modem device 100 exemplarily illustrated in FIG. 11. In the method disclosed herein, a HART soft modem 1108 integrated within a single microcontroller 101 that runs multiple instances of the HART soft modem 1108 exemplarily illustrated in FIG. 11, is provided 1201. The HART soft modem 1108 is in operable communication with multiple analog to digital converters 101*a*, the serial peripheral interface 101*c*, and the parallel to serial converter 101*f* in the single microcontroller 101 and with the media access unit 102 as exemplarily illustrated in FIG. 11. The analog to digital converters 101*a* communicate with multiple sensor devices 1101 via multiple analog interfaces 1102 exemplarily illustrated in FIG. 11.

The analog to digital converters 101*a* convert 1202 each of the analog signals comprising the HART messages into digitized analog samples by sampling and digitizing the analog signals. The parallel to serial converter 101*f* converts 1203 each of the HART messages from the digitized analog samples into serial data bit streams comprising binary information. The frequency shift keying (FSK) modulator 101*d* of the HART soft modem 1108 exemplarily illustrated in FIG. 11, processes 1204 each of the serial data bit streams one at a time in the single microcontroller 101. For the processing of each of the serial data bit streams, the FSK modulator 101*d* checks 1204*a* a value of the binary information of each of the serial data bit streams. The FSK modulator 101*d* sets 1204*b* a phase change of a carrier signal to a first frequency when the value of the binary information is 1. The first frequency is, for example, 1200 hertz (Hz), and the phase change is, for example, about 45 degrees at a sampling rate of about 9600 Hz. The FSK modulator 101*d* sets 1204*b* a phase change of the carrier signal to a second frequency when the value of the binary information is 0. The second frequency is, for example, 2200 Hz, and the phase change is, for example, about 82.5 degrees at a sampling rate of about 9600 Hz. The FSK modulator 101*d* accumulates 1204*c* incremental phase change data by continuously adding the phase changes of the carrier signal. The FSK modulator 101*d* compares 1204*d* the accumulated phase change data with multiple sine values from a predetermined sine value phase table as disclosed in the detailed description of FIG. 2. The FSK modulator 101*d* selects 1204*e* a sine value corresponding to the accumulated phase change data from the predetermined sine value phase table disclosed in the detailed description of FIG. 2. The media access unit 102, in communication with the FSK modulator 101*d* via the serial peripheral interface 101*c*, converts 1205 the selected sine value into an analog signal for transmission of each of the HART messages.

Figure 13A:
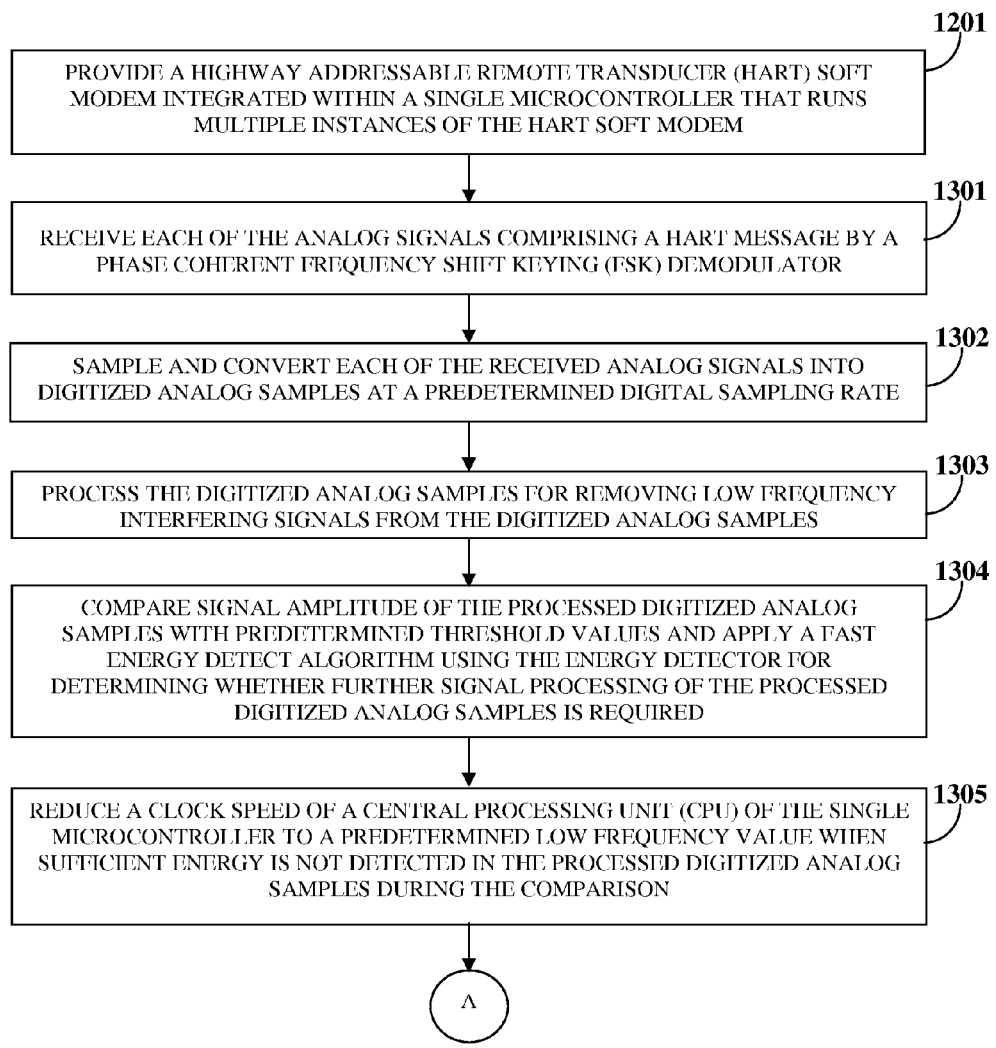
FIGS. 13A-13B illustrate an embodiment of the method for receiving and demodulating multiple analog signals comprising Highway Addressable Remote Transducer messages using the Highway Addressable Remote Transducer soft modem device exemplarily illustrated in FIG. 11.
Figure 13B:
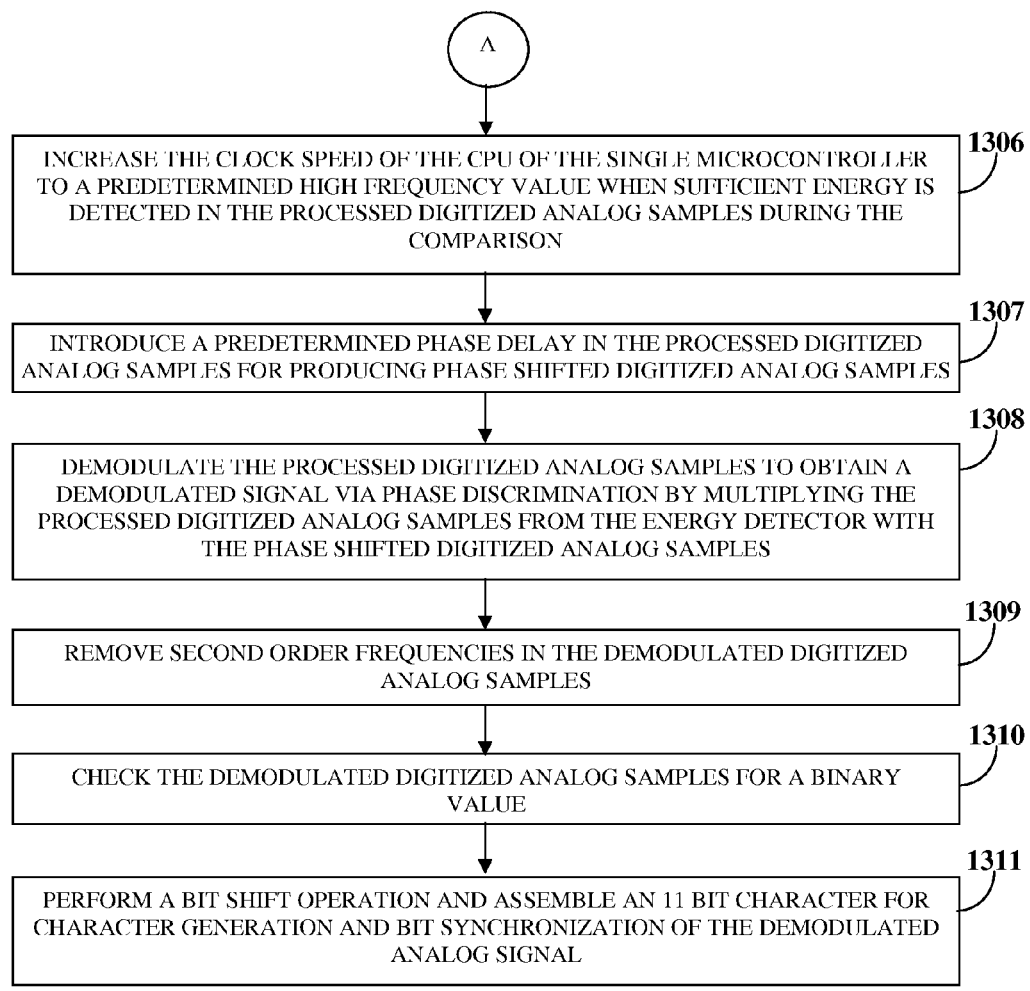

FIGS. 13A-13B illustrate an embodiment of the method for receiving and demodulating multiple analog signals comprising Highway Addressable Remote Transducer (HART) messages using the HART soft modem device 100 exemplarily illustrated in FIG. 11. In the method disclosed herein, the HART soft modem device 100 comprising the HART soft modem 1108 integrated within the single microcontroller 101 that runs multiple instances of the HART soft modem 1108 exemplarily illustrated in FIG. 11, is provided 1201. The frequency shift keying (FSK) demodulator 101*e* of the HART soft modem 1108 exemplarily illustrated in FIG. 11, receives 1301 each of the analog signals comprising a HART message.

The FSK demodulator 101e samples and converts 1302 each of the received analog signals into digitized analog samples at a predetermined digital sampling rate. The predetermined digital sampling rate or sampling frequency is, for example, about 9600 Hz or about 19200 Hz. The FSK demodulator 101e processes 1303 the digitized analog samples for removing low frequency interfering signals from the digitized analog samples. The FSK demodulator 101e compares 1304 the signal amplitude of the processed digitized analog samples with predetermined threshold values and applies a fast energy detect algorithm using the energy detector 403 exemplarily illustrated in FIG. 11, for determining whether further signal processing of the processed digitized analog samples is required. The FSK demodulator 101e reduces 1305 a clock speed of the central processing unit (CPU) 101b of the single microcontroller 101 exemplarily illustrated in FIG. 11, to a predetermined low frequency value when sufficient energy is not detected in the processed digitized analog samples during the comparison. The predetermined low frequency value is, for example, 1 MHz.

The frequency shift keying (FSK) demodulator 101e increases 1306 the clock speed of the central processing unit (CPU) 101b of the single microcontroller 101 to a predetermined high frequency value when sufficient energy is detected in the processed digitized analog samples during the comparison. The predetermined high frequency value is, for example, 4 MHz. The FSK demodulator 101e introduces 1307 a predetermined phase delay in the processed digitized analog samples for producing phase shifted digitized analog samples. The FSK demodulator 101e demodulates 1308 the processed digitized analog samples to obtain a demodulated analog signal via phase discrimination by multiplying the processed digitized analog samples from the energy detector 403 with the phase shifted digitized analog samples. The FSK demodulator 101e removes 1309 second order frequencies in the demodulated digitized analog samples. The FSK demodulator 101e checks 1310 the demodulated digitized analog samples for a binary value, where a positive demodulated digitized analog sample represents a 1 and a negative demodulated digitized analog sample represents a 0. The FSK demodulator 101e performs 1311 a bit shift operation and assembles an 11 bit character for character generation and bit synchronization of the demodulated analog signal. The Highway Addressable Remote Transducer (HART) soft modem device 100 maintains a HART communications protocol timing of the single microcontroller 101 by using separate clocks for the CPU 101b and peripherals connected to the single microcontroller 101. In an embodiment, the FSK demodulator 101e turns off or deactivates the CPU 101b of the single microcontroller 101 and uses direct memory access to handle digital signal processing functions which involve repetitive operations, for example, multiplication and/or accumulation and data shift operations.

The foregoing examples have been provided merely for the purpose of explanation and are in no way to be construed as limiting of the methods and the Highway Addressable Remote Transducer (HART) soft modem device 100 disclosed herein. While the methods and the HART soft modem device 100 have been described with reference to various embodiments, it is understood that the words, which have been used herein, are words of description and illustration, rather than words of limitation. Further, although the methods and the HART soft modem device 100 have been described herein with reference to particular means, materials, and embodiments, the methods and the HART soft modem device 100 are not intended to be limited to the particulars disclosed herein; rather, the methods and the HART soft modem device 100 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the methods and the HART soft modem device 100 disclosed herein in their aspects.

I claim:

1. A method for modulating and transmitting multiple analog signals comprising highway addressable remote transducer messages, said method comprising:

providing a highway addressable remote transducer soft modem integrated within a single microcontroller, said single microcontroller configured to run a plurality of instances of said highway addressable remote transducer soft modem, wherein said highway addressable remote transducer soft modem is in operable communication with a plurality of analog to digital converters, a serial peripheral interface, and a parallel to serial converter in said single microcontroller and with a media access unit, and wherein said analog to digital converters are configured to communicate with a plurality of sensor devices via a plurality of analog interfaces;

converting each of said analog signals comprising said highway addressable remote transducer messages into digitized analog samples by said analog to digital converters, by sampling and digitizing said analog signals;

converting each of said highway addressable remote transducer messages from said digitized analog samples into serial data bit streams comprising binary information by said parallel to serial converter;

processing each of said serial data bit streams one at a time in said single microcontroller, wherein said processing of each of said serial data bit streams comprises:

checking a value of said binary information of said each of said serial data bit streams by a phase coherent frequency shift keying modulator of said highway addressable remote transducer soft modem;

setting a phase change of a carrier signal to a first frequency when said value of said binary information is 1 and setting said phase change of said carrier signal to a second frequency when said value of said binary information is 0, by said phase coherent frequency shift keying modulator;

accumulating incremental phase change data by continuously adding said phase change of said carrier signal, by said phase coherent frequency shift keying modulator;

comparing said accumulated phase change data with a plurality of sine values from a predetermined sine value phase table by said phase coherent frequency shift keying modulator; and selecting one of said sine values corresponding to said accumulated phase change data from said predetermined sine value phase table by said phase coherent frequency shift keying modulator; and converting said selected one of said sine values into an analog signal by said media access unit, in communication with said phase coherent frequency shift keying modulator via said serial peripheral interface, for transmission of said each of said highway addressable remote transducer messages.

2. The method of claim 1, wherein said first frequency is 1200 Hz and said second frequency is 2200 Hz.

3. A method for receiving and demodulating multiple analog signals comprising highway addressable remote transducer messages, said method comprising:

providing a highway addressable remote transducer soft modem integrated within a single microcontroller, said single microcontroller configured to run a plurality of instances of said highway addressable remote transducer soft modem, wherein said highway addressable remote transducer soft modem is in operable communication with a plurality of analog to digital converters, a serial peripheral interface, and a parallel to serial converter in said single microcontroller, and wherein said analog to digital converters are configured to communicate with a plurality of sensor devices via a plurality of analog interfaces;

receiving each of said analog signals comprising said highway addressable remote transducer messages by a phase coherent frequency shift keying demodulator of said highway addressable remote transducer soft modem;

sampling and converting said received each of said analog signals into digitized analog samples by said phase coherent frequency shift keying demodulator at a predetermined digital sampling rate;

processing said digitized analog samples by said phase coherent frequency shift keying demodulator for removing low frequency interfering signals from said digitized analog samples;

comparing signal amplitude of said processed digitized analog samples with predetermined threshold values and applying a fast energy detect algorithm using an energy detector, by said phase coherent frequency shift keying demodulator for determining whether further signal processing of said processed digitized analog samples is required;

reducing a clock speed of a central processing unit of said single microcontroller to a predetermined low frequency value by said phase coherent frequency shift keying demodulator, when sufficient energy is not detected in said processed digitized analog samples during said comparison;

increasing said clock speed of said central processing unit of said single microcontroller to a predetermined high frequency value by said phase coherent frequency shift keying demodulator, when sufficient energy is detected in said processed digitized analog samples during said comparison;

introducing a predetermined phase delay in said processed digitized analog samples by said phase coherent frequency shift keying demodulator for producing phase shifted digitized analog samples;

demodulating said processed digitized analog samples to obtain a demodulated analog signal, by said phase coherent frequency shift keying demodulator, via phase discrimination by multiplying said processed digitized analog samples from said energy detector with said phase shifted digitized analog samples;

removing second order frequencies in said demodulated digitized analog samples, by said phase coherent frequency shift keying demodulator;

checking said demodulated digitized analog samples for a binary value, by said phase coherent frequency shift keying demodulator, wherein a positive demodulated digitized analog sample represents a 1 and a negative demodulated digitized analog sample represents a 0; and performing a bit shift operation and assembling an 11 bit character, by said phase coherent frequency shift keying demodulator, for character generation and bit synchronization of said demodulated analog signal.

4. The method of claim 3, wherein said predetermined low frequency value is 1 MHz and said predetermined high frequency value is 4 MHz.

5. The method of claim 3, further comprising deactivating said central processing unit of said single microcontroller and using direct memory access by said phase coherent frequency shift keying demodulator to handle repetitive operations.

6. The method of claim 3, wherein said predetermined digital sampling rate is one of 9600 Hz and 19200 Hz.

7. The method of claim 3, further comprising maintaining a protocol timing of said single microcontroller by using separate clocks for said central processing unit and peripherals connected to said single microcontroller.

8. A method for performing energy detection and determining speed of a clock of a central processing unit of a single microcontroller integrated with a highway addressable remote transducer soft modem, said single microcontroller configured to run a plurality of instances of said highway addressable remote transducer soft modem, said method comprising:

receiving digitized analog samples from a high pass filter of a phase coherent frequency shift keying demodulator of said highway addressable remote transducer soft modem, by an energy detector of said phase coherent frequency shift keying demodulator;

comparing signal amplitude of said received digitized analog samples with predetermined threshold values by said energy detector;

detecting presence of a valid highway addressable remote transducer analog signal by said energy detector, when said comparison results in a value greater than said predetermined threshold values, and increasing said speed of said clock of said central processing unit to a predetermined high frequency value by said energy detector;

setting an energy detect count value to a predetermined value and decrementing said energy detect count value, by said energy detector, when said signal amplitude of said received digitized analog samples is less than said predetermined threshold values; and detecting absence of said valid highway addressable remote transducer analog signal by said energy detector, when said energy detect count value is less than zero, and reducing said speed of said clock of said central processing unit by said energy detector for reducing power consumption of said central processing unit.

9. The method of claim 8, further comprising maintaining a protocol timing of said single microcontroller by using separate clocks for said central processing unit and peripherals connected to said single microcontroller.

10. The method of claim 8, wherein said predetermined threshold values comprise a predetermined upper threshold value and a predetermined lower threshold value.

* * * * *